US012659080B2

(12) United States Patent
Huang

(10) Patent No.: US 12,659,080 B2
(45) Date of Patent: Jun. 16, 2026

(54) ENCODING METHOD, DEVICE, AND READABLE STORAGE MEDIUM

(71) Applicant: VIVO MOBILE COMMUNICATION CO., LTD., Guangdong (CN)

(72) Inventor: Wei Huang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 18/777,738

(22) Filed: Jul. 19, 2024

(65) Prior Publication Data

US 2024/0388382 A1 Nov. 21, 2024

Related U.S. Application Data

(63) Continuation of application No. PCT/CN2023/072301, filed on Jan. 16, 2023.

(30) Foreign Application Priority Data

Jan. 20, 2022 (CN) .......................... 202210067513.9

(51) Int. Cl.
*H04L 1/06* (2006.01)

(52) U.S. Cl.
CPC .......... *H04L 1/0643* (2013.01); *H04L 1/0668* (2013.01)

(58) Field of Classification Search
CPC ... H04L 1/0643; H04L 1/0668; H04B 7/0669; H04B 7/0456; H04B 7/22; H04J 13/004
USPC ....................................... 375/295
See application file for complete search history.

(56) References Cited

U.S. PATENT DOCUMENTS

| | | | |
|---|---|---|---|
| 2006/0039495 A1 | 2/2006 | Chae et al. | |
| 2016/0308595 A1* | 10/2016 | Yamada | ............... H04B 7/0413 |
| 2021/0242919 A1* | 8/2021 | Park | .................... H04B 7/0617 |
| 2021/0250868 A1 | 8/2021 | Ma et al. | |

FOREIGN PATENT DOCUMENTS

| | | |
|---|---|---|
| CN | 101141232 A | 3/2008 |
| CN | 101789814 A | 7/2010 |
| CN | 102045134 A | 5/2011 |
| CN | 108234082 A | 6/2018 |
| JP | 2006-039495 A1 | 2/2006 |
| JP | 2012-510187 A | 4/2012 |
| WO | WO-2020/166086 A1 | 8/2020 |
| WO | WO-2021/007810 A1 | 1/2021 |

OTHER PUBLICATIONS

Extended Search Report on EP Patent Appl. No. 23742838.8 dtd Apr. 14, 2025.

(Continued)

*Primary Examiner* — Fitwi Y Hailegiorgis
(74) *Attorney, Agent, or Firm* — Foley & Lardner LLP

(57) ABSTRACT

This application discloses an encoding method, a device, and a readable storage medium. The method includes: performing, by an encoder, space-time block code encoding on data based on a preset codebook, where the preset codebook is a non-full-rate orthogonal codebook over a field of complex numbers in which an Alamouti codebook sub-block in the codebook is replaced with an NSTBC codebook sub-block, and columns of the preset codebook are pairwise orthogonal.

20 Claims, 5 Drawing Sheets

(56) References Cited

OTHER PUBLICATIONS

Huawei: "Transmit diversity for distributed, common and broadcast channels", 3GPP Draft; R1-051406, 3rd Generation Partnership Project (3GPP), Mobile Competence Centre; 650, Route Des Lucioles; F-06921 Sophia-Antipolis Cedex; France, vol. RAN WG1, No. Seoul, Korea; Oct. 31, 2005, Oct. 31, 2005 (Oct. 31, 2005), XP050100998, [retrieved on Oct. 31, 2005] *the whole document*.
International Search Report on PCT Patent Appl. No. PCT/CN2023/072301 dtd Mar. 24, 2023.
JP Office Action on JP 2024-543173 dtd Jul. 29, 2025.
On converting OSTC scheme from Non-full rate to Full-rate with better error performance.

* cited by examiner

201

An encoder performs space-time block code
encoding based on a preset codebook

300

Encoding apparatus

301

Encoding
module

400

Communication device

401

402

Processor ◄------► Memory

ENCODING METHOD, DEVICE, AND READABLE STORAGE MEDIUM

CROSS-REFERENCE TO RELATED APPLICATIONS

This application is a Bypass continuation application of PCT International Application No. PCT/CN2023/072301 filed on Jan. 16, 2023, which claims priority to Chinese Patent Application No. 202210067513.9, filed in China on Jan. 20, 2022, which are incorporated herein by reference in their entireties.

TECHNICAL FIELD

This application pertains to the field of communication technologies, and specifically relates to an encoding method, a device, and a readable storage medium.

BACKGROUND

A full-rate orthogonal codebook can achieve a full rate while achieving a full diversity gain. However, so far, for this type of codebook, a full-rate orthogonal codebook over a field of complex numbers has only N=2 dimensions, and a full-rate codebook over a field of real numbers has only N=2, 4, or 8 dimensions. A full-rate quasi-orthogonal codebook extends dimensions of the full-rate orthogonal codebook. In particular, this type of codebook can extend dimensions to N≥2 over the field of complex numbers and achieve a diversity gain slightly worse than the full diversity gain. However, this type of codebook has the following problem: Because orthogonality of the codebook is destroyed, a receive end cannot implement maximum likelihood detection through simple linear processing, processing complexity of the receive end is increased, and communication performance is degraded.

A non-full-rate orthogonal codebook ensures orthogonality of the codebook by reducing frequency band utilization or a rate requirement, but the conventional non-full-rate orthogonal codebook is designed for conventional active radio frequency communication, without considering modulation characteristics and implementation complexity of passive terminals similar to backscatter communication terminals.

SUMMARY

Embodiments of this application provide an encoding method, a device, and a readable storage medium.

According to a first aspect, an encoding method is provided and includes:

performing, by an encoder, space-time block code encoding on data based on a preset codebook, where the preset codebook is a non-full-rate orthogonal codebook over a field of complex numbers in which an Alamouti codebook sub-block in the codebook is replaced with a new space-time block code (NSTBC) codebook sub-block, and columns of the preset codebook are pairwise orthogonal.

According to a second aspect, an encoding apparatus is provided and includes:

an encoding module, configured to perform, by an encoder, space-time block code encoding on data based on a preset codebook, where the preset codebook is a non-full-rate orthogonal codebook over a field of complex numbers in which an Alamouti codebook sub-block in the codebook is replaced with an NSTBC codebook sub-block, and columns of the preset codebook are pairwise orthogonal.

According to a third aspect, an encoder is provided and includes a processor and a communication interface. The processor is configured to perform, by the encoder, space-time block code encoding on data based on a preset codebook, where the preset codebook is a non-full-rate orthogonal codebook over a field of complex numbers in which an Alamouti codebook sub-block in the codebook is replaced with an NSTBC codebook sub-block, and columns of the preset codebook are pairwise orthogonal.

According to a fourth aspect, a terminal is provided. The terminal includes a processor and a memory. The memory stores a program or instructions capable of running on the processor. When the program or instructions are executed by the processor, the steps of the method according to the first aspect are implemented.

According to a fifth aspect, a network-side device is provided. The network-side device includes a processor and a memory. The memory stores a program or instructions capable of running on the processor. When the program or instructions are executed by the processor, the steps of the method according to the first aspect are implemented.

According to a sixth aspect, a readable storage medium is provided. The readable storage medium stores a program or instructions. When the program or instructions are executed by a processor, the steps of the method according to the first aspect are implemented.

According to a seventh aspect, a chip is provided. The chip includes a processor and a communication interface. The communication interface is coupled to the processor. The processor is configured to run a program or instructions to implement the method according to the first aspect.

According to an eighth aspect, a computer program product is provided. The computer program product is stored in a storage medium. The computer program product is executed by at least one processor to implement the steps of the method according to the first aspect.

According to a ninth aspect, a communication device is provided and configured to perform the method according to the first aspect.

DESCRIPTION OF EMBODIMENTS

Figure 1A:
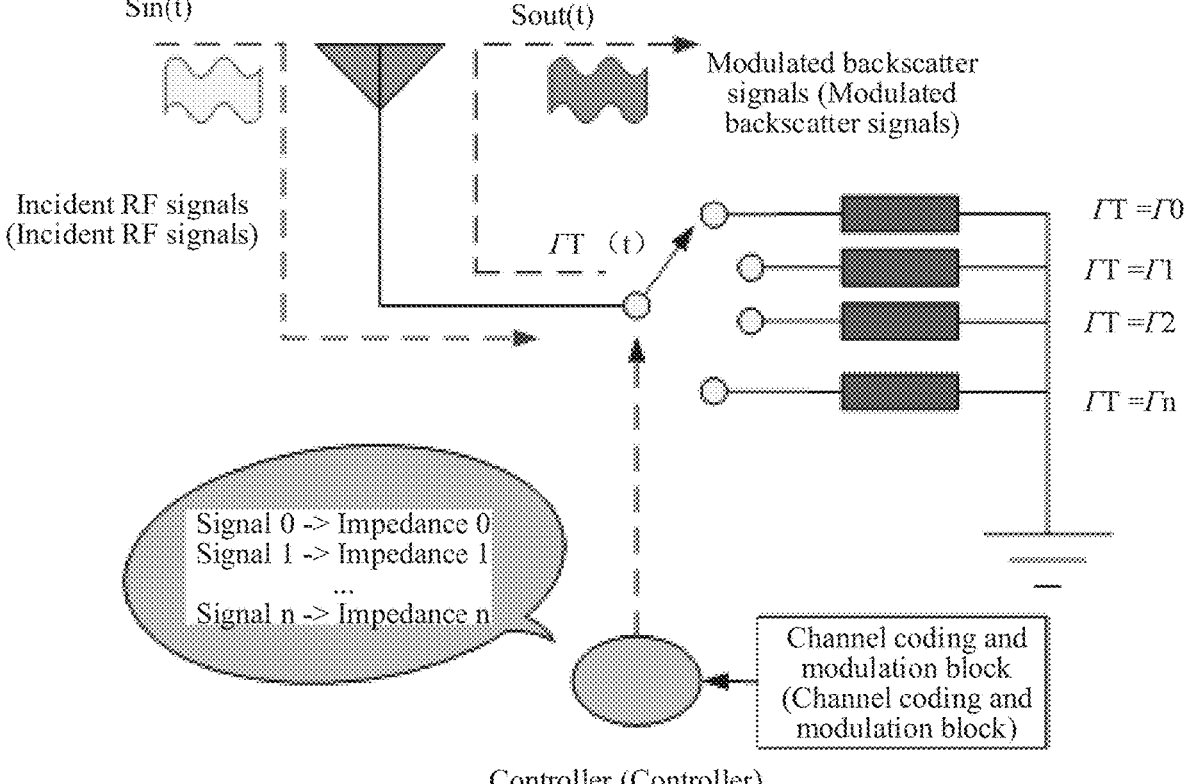
FIG. 1a is a schematic diagram of a structure of a backscatter communication transmit end.

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that the terms used in this way are interchangeable in appropriate circumstances, so that the embodiments of this application can be implemented in other orders than the order illustrated or described herein. In addition, objects distinguished by "first" and "second" usually fall within one class, and a quantity of objects is not limited. For example, there may be one or more first objects. In addition, the term "and/or" in the specification and claims indicates at least one of connected objects, and the character "/" generally represents an "or" relationship between associated objects.

It should be noted that technologies described in the embodiments of this application are not limited to a long term evolution (LTE)/LTE-Advanced (LTE-A) system, and can also be used in other wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. The described technologies may be used for the foregoing systems and radio technologies, and may also be used for other systems and radio technologies. However, in the following descriptions, the new radio (NR) system is described for an illustrative purpose, and NR terms are used in most of the following descriptions. These technologies may also be applied to other applications than an NR system application, for example, a 6th Generation (6G) communication system.

In the embodiments of this application, an encoder may be deployed on a transmitting device, which may be, for example, a terminal or a network-side device. The terminal may be a terminal-side device such as a mobile phone, a tablet personal computer (TPC), a laptop computer (LC) or a notebook computer, a personal digital assistant (PDA), a palmtop computer, a netbook, an ultra-mobile personal computer (UMPC), a mobile Internet device (MID), an augmented reality (AR) or virtual reality (VR) device, a robot, a wearable device (WD), vehicle user equipment (VUE), pedestrian user equipment (PUE), a smart home (a home device having a wireless communication function, such as a refrigerator, a television, a washing machine, or furniture), a game console, a personal computer (PC), a teller machine, or a self-service machine. The wearable device includes a smartwatch, a smart band, a smart headphone, smart glasses, smart jewelry (a smart bracelet, a smart wrist chain, a smart ring, a smart necklace, a smart anklet, a smart ankle chain, or the like), a smart wristband, smart clothing, or the like. It should be noted that a specific type of the terminal is not limited in the embodiments of this application. The network-side device may include an access network device or a core network device. The access network device may also be referred to as a radio access network device, a radio access network (RAN), a radio access network function, or a radio access network element. The access network device may include a base station, a wireless local area network (WLAN) access point, a Wireless Fidelity (Wi-Fi) node, or the like. The base station may be referred to as a NodeB, an evolved NodeB (eNB), an access point, a base transceiver station (BTS), a radio base station, a radio transceiver, a basic service set (BSS), an extended service set (ESS), a home NodeB, a home evolved NodeB, a transmission and reception point (TRP), or another appropriate term in the art. As long as the same technical effect is achieved, the base station is not limited to specific technical terms. It should be noted that in the embodiments of this application, only a base station in an NR system is used as an example for description, but a specific type of the base station is not limited. The core network device may include but is not limited to at least one of the following: a core network node, a core network function, a mobility management entity (MME), an access and mobility management function (AMF), a session management function (SMF), a user plane function (UPF), a policy control function (PCF), a policy and charging rules function (PCRF), an edge application server discovery function (EASDF), unified data management (UDM), a unified data repository (UDR), a home subscriber server (HSS), a centralized network configuration (CNC), a network repository function (NRF), a network exposure function (NEF), a local NEF (L-NEF), a binding support function (BSF), an application function (AF), or the like. It should be noted that in the embodiments of this application, only a core network device in the NR system is used as an example for description, but a specific type of the core network device is not limited.

For better understanding the technical solutions of this application, the following content is first described.

A future 6G communication network needs to support the massive Internet of Everything, where a quantity of IoT devices will reach hundreds of billions, and a connection density thereof will be 10-100 times higher than that of 5G, reaching a connection density of $10\text{-}100/\text{m}^2$. The massive IoT devices pose new challenges in terms of cost and power consumption. Cellular networking, low cost, low power consumption, and even passive zero power consumption are main trends in development of IoT devices in the future. Conventional passive terminals are limited by power consumption and hardware capabilities of the terminals, and communication transmission distances of most of the terminals are less than 10 meters, far from a goal of cellular coverage of 100 meters. Therefore, how to effectively increase communication distances of passive terminals has become a difficulty that needs to be resolved after cellular networking of this technology.

Backscatter Communication (BSC):

Backscatter communication means that a backscatter communication device uses a radio frequency signal from another device or in an environment to perform signal modulation to transmit information of the backscatter communication device. A modulation circuit for backscatter communication is shown in FIG. 1a. The backscatter communication device controls a reflection coefficient $\Gamma$ of the circuit by adjusting an internal impedance of the backscatter communication device, thereby changing an amplitude, a frequency, a phase, or the like of an incident signal to implement signal modulation. The reflection coefficient of the signal may be represented as:

$$\Gamma = \frac{Z_1 - Z_0}{Z_1 + Z_0} = |\Gamma| e^{j\theta_T},$$

5 where

Z$_0$ is an antenna characteristic impedance, Z$_1$ is a load impedance, j represents a complex number, and $\theta_T$ represents a phase. Assuming that the incident signal is S$_{in}$(t), an output signal is S$_{out}$(t)=S$_{in}$(t)$|\Gamma|e^{j\theta_T}$. Therefore, corresponding amplitude modulation, frequency modulation, or phase modulation can be implemented by properly controlling the reflection coefficient. Based on this, the backscatter communication device may be a tag in a conventional radio frequency identification (RFID), or a tag in the passive or semi-passive Internet of Things (IoT). For convenience, the foregoing is collectively referred to as BSC user equipment (UE).

Full-Rate Orthogonal Space-Time Block Code (OSTBC):

Space-time block codes (STBC) are widely applied in cellular communication and wireless local area networks. By introducing signal redundancy in space domain and time domain and properly constructing a block encoding transmission matrix, the STBC achieves a diversity gain and an antenna gain without increasing a bandwidth.

An OSTBC is a special linear STBC, and its linear space-time block code S meets the following single condition:

$$S^H S = \sum_{i=1}^M |s_i|^2 I,$$

where

I represents an identity matrix with M dimensions, i represents an i$^{th}$ element in the M dimensions, s$_i$ is a diagonal element, an element in an i$^{th}$ row in S represents a symbol transmitted on an i$^{th}$ transmit antenna within M moments, and an element in a j$^{th}$ column in S represents a symbol transmitted at a j$^{th}$ moment on an n$_t$$^{th}$ antenna. In the transmission matrix S, columns that meet the foregoing formula are mutually orthogonal, which means that signal sequences transmitted on different antennas are also orthogonal, thereby ensuring that the STBC can achieve a full diversity gain at the same time. A corresponding decoder only needs to perform simple maximum ratio combining (MRC) to sequentially decouple transmitted symbols on different antennas, and perform detection and estimation by using a maximum likelihood detection (ML) algorithm.

Figure 1B:
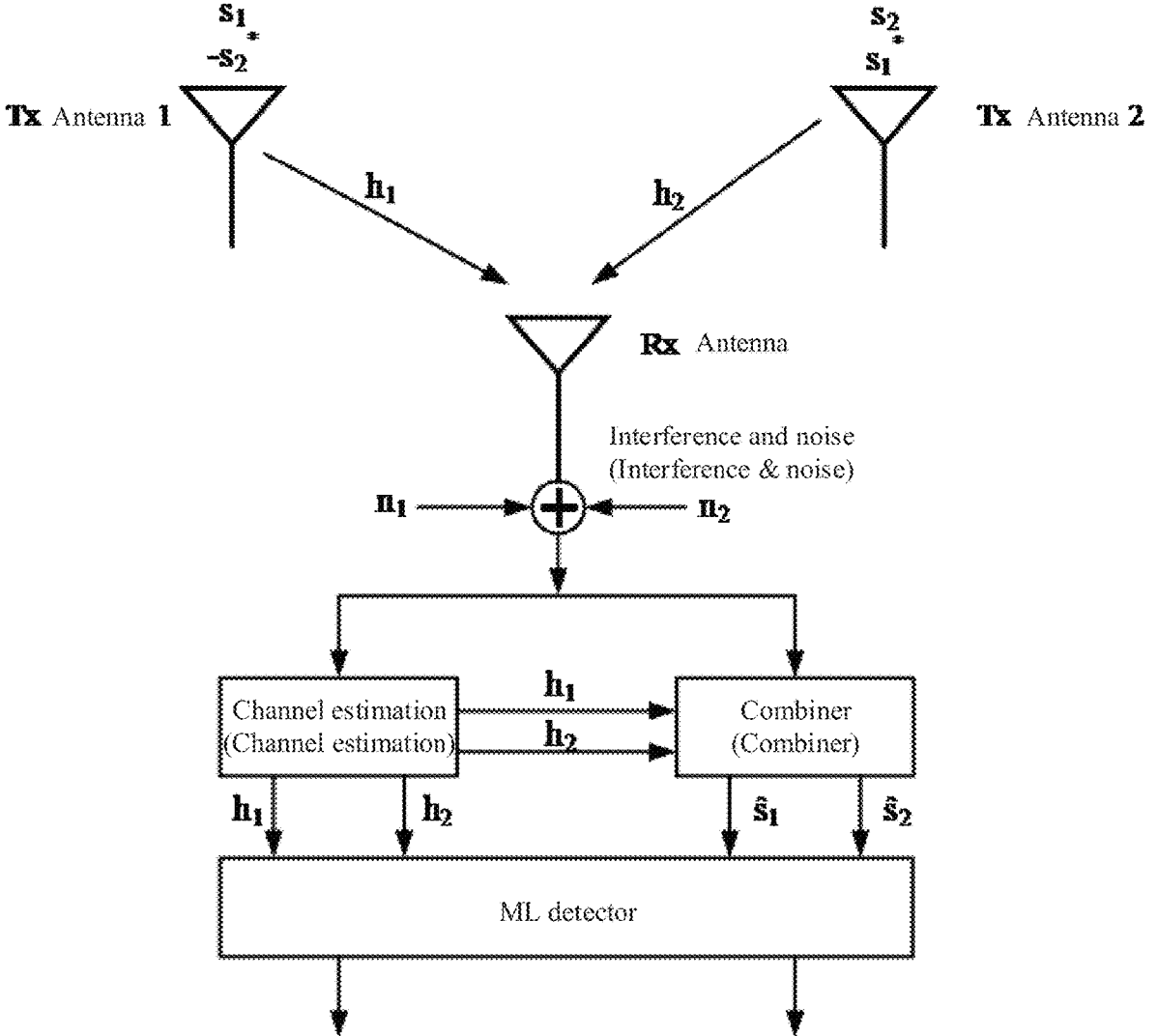
FIG. 1b is a schematic diagram of Alamouti space-time block code diversity transmission.

An Alamouti code is a most representative OSTBC code and can achieve a full diversity gain and a full rate gain. FIG. 1$b$ is a principle block diagram of the Alamouti code. In a given symbol period, two symbols are transmitted simultaneously on two antennas. It is assumed that in a current symbol period, a symbol transmitted on antenna 1 is denoted as s$_1$, and that a symbol transmitted on antenna 2 is denoted as s$_2$. In a next symbol period, a symbol transmitted on antenna 1 is $(-s_2^*)$, and a symbol transmitted on antenna 2 is s$_1$*. In this way, the following space-time block code matrix is formed:

$$S = \begin{bmatrix} s_1 & s_2 \\ -s_2^* & s_1^* \end{bmatrix}.$$

6

Assuming that channels from the two transmit antennas to receive antennas are represented as h$_1$ and h$_2$ respectively and meet time-invariant characteristics in two adjacent symbol periods, that is:

$$h_1(t) = h_1(t+T) = h_1 = \alpha_1 e^{j\theta_1}, \text{ and}$$

$$h_2(t) = h_2(t+T) = h_2 = \alpha_2 e^{j\theta_1},$$

received signals on the receive antennas in the two symbol periods are:

$$r_1 = r(t) = h_1 s_1 + h_2 s_2 + n_1, \text{ and}$$

$$r_2 = r(t+T) = -h_1 s_2^* + h_2 s_1^* + n_2,$$

where n$_1$ and n$_2$ represent received noise and signal interference. The decoder performs combined reception according to the following rules:

$$\hat{s}_1 = h_1^* r_1 + h_2 r_2^*, \text{ and}$$

$$\hat{s}_2 = h_2^* r_1 - h_1 r_2^*.$$

The following may be obtained by substituting the received signals r$_1$ and r$_2$:

$$\hat{s}_1 = (\alpha_1^2 + \alpha_2^2)s_1 + h_1^* n_1 + h_2 n_2^*, \text{ and}$$

$$\hat{s}_2 = (\alpha_1^2 + \alpha_2^2)s_2 - h_1 n_2^* + h_2^* n_1.$$

Finally, signals s$_1$ and s$_2$ can be estimated by using an ML detector.

In addition to the typical Alamouti block code, a codebook of typical two-antenna OSTBCs is shown in Table 1.

TABLE 1

| S | −S | S* | −S* |
|---|---|---|---|
| $\begin{bmatrix} -s_1 & s_2 \\ s_2^* & s_1^* \end{bmatrix}$ | $\begin{bmatrix} s_1 & -s_2 \\ -s_2^* & -s_1^* \end{bmatrix}$ | $\begin{bmatrix} -s_1^* & s_2^* \\ s_2 & s_1 \end{bmatrix}$ | $\begin{bmatrix} s_1^* & -s_2^* \\ -s_2 & -s_1 \end{bmatrix}$ |
| $\begin{bmatrix} s_1 & -s_2 \\ s_2^* & s_1^* \end{bmatrix}$ | $\begin{bmatrix} -s_1 & s_2 \\ -s_2^* & -s_1^* \end{bmatrix}$ | $\begin{bmatrix} s_1^* & -s_2^* \\ s_2 & s_1 \end{bmatrix}$ | $\begin{bmatrix} -s_1^* & s_2^* \\ -s_2 & -s_1 \end{bmatrix}$ |
| $\begin{bmatrix} s_1 & s_2 \\ s_2^* & -s_1^* \end{bmatrix}$ | $\begin{bmatrix} -s_1 & -s_2 \\ -s_2^* & s_1^* \end{bmatrix}$ | $\begin{bmatrix} s_1^* & s_2^* \\ s_2 & -s_1 \end{bmatrix}$ | $\begin{bmatrix} -s_1^* & -s_2^* \\ -s_2 & s_1 \end{bmatrix}$ |
| $\begin{bmatrix} s_1 & s_2 \\ -s_2^* & s_1^* \end{bmatrix}$ | $\begin{bmatrix} -s_1 & -s_2 \\ s_2^* & -s_1^* \end{bmatrix}$ | $\begin{bmatrix} s_1^* & s_2^* \\ -s_2 & s_1 \end{bmatrix}$ | $\begin{bmatrix} -s_1^* & -s_2^* \\ s_2 & -s_1 \end{bmatrix}$ |

Besides two-dimensional orthogonal space-time block codes over a field of complex numbers, there are also many orthogonal space-time block codes over a field of real numbers, which are not limited by codebook dimensions. Several typical orthogonal space-time block codes over the field of real numbers are as follows:

$$\mathcal{G}_4 = \begin{pmatrix} s_1 & s_2 & s_3 & s_4 \\ -s_2 & s_1 & -s_4 & s_3 \\ -s_3 & s_4 & s_1 & -s_2 \\ -s_4 & -s_3 & s_2 & s_1 \end{pmatrix}; \text{ and}$$

$$\mathcal{G}_8 = \begin{pmatrix} s_1 & s_2 & s_3 & s_4 & s_5 & s_6 & s_7 & s_8 \\ -s_2 & s_1 & s_4 & -s_3 & s_6 & -s_5 & -s_8 & s_7 \\ -s_3 & -s_4 & s_1 & s_2 & s_7 & s_8 & -s_5 & -s_6 \\ -s_4 & s_3 & -s_2 & s_1 & s_8 & -s_7 & s_6 & -s_5 \\ -s_5 & -s_6 & -s_7 & -s_8 & s_1 & s_2 & s_3 & s_4 \\ -s_6 & s_5 & -s_8 & s_7 & -s_2 & s_1 & -s_4 & s_3 \\ -s_7 & s_8 & s_5 & -s_6 & -s_3 & s_4 & s_1 & -s_2 \\ -s_8 & -s_7 & s_6 & s_5 & -s_4 & -s_3 & s_2 & s_1 \end{pmatrix}.$$

Because an orthogonal codebook ensures that a received signal is only linear superposition of a transmitted signal with noise, a receive end can achieve an effect of maximum likelihood estimation only by simple linear processing. Further, differential space-time block codes also require orthogonality of the codebook. However, unfortunately, up to now, a full-rate orthogonal codebook over the field of complex numbers has only N=2 dimensions, and a full-rate codebook over the field of real numbers has only N=2, 4, or 8 dimensions.

Full-Rate Quasi-Orthogonal Space-Time Block Code (QSTBC):

Although the OSTBC can achieve a full diversity gain and full-rate transmission, unfortunately, it has been proved that no OSTBC codebook can achieve both a full diversity gain and a full rate when a quantity of transmit antennas is greater than 2. The quasi-orthogonal space-time block code QSTBC is an extended STBC block code codeword. In this codeword, columns in an encoding matrix may be divided into groups, and column elements in each group are not orthogonal, but orthogonality between different groups is still maintained. More generally, for a codeword matrix S with N×N dimensions, the matrix meets:

$$SS^H = \sum_{i=1}^{N} |s_i|^2 Q,$$

where

Q is a sparse matrix, a diagonal element of the sparse matrix is 1, and at least $N^2/2$ zero elements are off-diagonal. Therefore, the codeword matrix S that meets the foregoing formula is a QSTBC codebook. Although the QSTBC cannot achieve both a full diversity gain and a full rate, the QSTBC can achieve a diversity gain slightly worse than the full diversity gain and can achieve the full rate.

Currently known QSTBCs include an EA-type QSTBC $S_{EA}$ proposed by Jajarkhani, an ABBA-type QSTBC $S_{ABBA}$, a PF-type QSTBC $S_{PF}$ proposed by Papadias and Foschini, and linear transformations of the three types of block code codewords. The following Table 2 and Table 3 show typical four-antenna transmit diversity codebooks. Table 2 shows typical four-antenna transmit diversity QSTBC codebooks. Table 3 shows typical four-antenna transmit diversity QSTBC codebooks after linear transformations.

TABLE 2

| ABBA-type QSTBCs | EA-type QSTBCs |
|---|---|
| $\begin{bmatrix} s_1 & s_2 & s_3 & s_4 \\ -s_2^* & s_1^* & -s_4^* & s_3^* \\ s_3 & s_4 & s_1 & s_2 \\ -s_4^* & s_3^* & -s_2^* & s_1^* \end{bmatrix}$ | $\begin{bmatrix} s_1 & s_2 & s_4 & s_3 \\ -s_2^* & s_1^* & -s_3^* & s_4^* \\ -s_4^* & -s_3^* & s_1^* & s_2^* \\ s_3 & -s_4 & -s_2 & s_1 \end{bmatrix}$ |

TABLE 2-continued

| ABBA-type QSTBCs | EA-type QSTBCs |
|---|---|
| $\begin{bmatrix} s_1 & -s_2 & s_3 & s_4 \\ s_2^* & s_1^* & -s_4^* & s_3^* \\ s_3 & s_4 & s_1 & -s_2 \\ -s_4^* & s_3^* & s_2^* & s_1^* \end{bmatrix}$ | $\begin{bmatrix} s_1 & s_2 & -s_4 & s_3 \\ -s_2^* & s_1^* & -s_3^* & -s_4^* \\ s_4^* & -s_3^* & s_1^* & s_2^* \\ s_3 & s_4 & -s_2 & s_1 \end{bmatrix}$ |
| $\begin{bmatrix} s_1 & s_3 & s_2 & s_4 \\ -s_3^* & s_1^* & -s_4^* & s_2^* \\ s_2 & s_4 & s_1 & s_3 \\ -s_4^* & s_2^* & -s_3^* & s_1^* \end{bmatrix}$ | $\begin{bmatrix} s_1 & s_4 & s_3 & s_2 \\ -s_4^* & s_1^* & -s_2^* & s_3^* \\ -s_3^* & -s_2^* & s_1^* & s_4^* \\ s_2 & -s_3 & -s_4 & s_1 \end{bmatrix}$ |
| $\begin{bmatrix} s_1 & -s_3 & s_2 & s_4 \\ s_3^* & s_1^* & -s_4^* & s_2^* \\ s_2 & s_4 & s_1 & -s_3 \\ -s_4^* & s_2^* & s_3^* & s_1^* \end{bmatrix}$ | $\begin{bmatrix} s_1 & -s_4 & s_3 & s_2 \\ s_4^* & s_1^* & -s_2^* & s_3^* \\ -s_3^* & -s_2^* & s_1^* & -s_4^* \\ s_2 & -s_3 & s_4 & s_1 \end{bmatrix}$ |
| $\begin{bmatrix} s_1 & s_2 & s_4 & s_3 \\ -s_2^* & -s_1^* & -s_3^* & s_4^* \\ s_4 & s_3 & s_1 & s_2 \\ -s_3^* & s_4^* & -s_2^* & s_1^* \end{bmatrix}$ | $\begin{bmatrix} s_1 & -s_2 & s_3 & s_4 \\ s_2^* & s_1^* & -s_4^* & s_3^* \\ -s_3^* & -s_4^* & s_1^* & -s_2^* \\ s_4 & -s_3 & s_2 & s_1 \end{bmatrix}$ |
| $\begin{bmatrix} s_1 & -s_2 & s_4 & s_3 \\ s_2^* & s_1^* & -s_3^* & s_4^* \\ s_4 & s_3 & s_1 & -s_2 \\ -s_3^* & s_4^* & -s_2^* & s_1^* \end{bmatrix}$ | $\begin{bmatrix} s_1 & s_2 & s_3 & s_4 \\ -s_2^* & s_1^* & -s_4^* & s_3^* \\ -s_3^* & -s_4^* & s_1^* & s_2^* \\ s_4 & -s_3 & -s_2 & s_1 \end{bmatrix}$ |

TABLE 3

| Linear transformations of ABBA-type QSTBCs | Linear transformations of EA-type QSTBCs |
|---|---|
| $\begin{bmatrix} s_1 & s_2 & s_4 & s_3 \\ -s_2^* & s_1^* & -s_3^* & s_4^* \\ -s_4 & s_3 & s_1 & -s_2 \\ s_3^* & s_4^* & -s_2^* & -s_1^* \end{bmatrix}$ | $\begin{bmatrix} s_1 & s_2 & s_4 & s_3 \\ -s_2^* & s_1^* & -s_3^* & s_4^* \\ -s_4^* & s_3^* & s_1^* & -s_2^* \\ s_3 & s_4 & -s_2 & -s_1 \end{bmatrix}$ |
| $\begin{bmatrix} s_1 & -s_2 & s_3 & s_4 \\ s_2^* & s_1^* & -s_4^* & s_3^* \\ -s_3 & s_4 & s_1 & s_2 \\ -s_4^* & -s_3^* & -s_2^* & s_1^* \end{bmatrix}$ | $\begin{bmatrix} s_1 & -s_2 & s_4 & s_3 \\ s_2^* & s_1^* & -s_3^* & s_4^* \\ -s_4^* & s_3^* & s_1^* & s_2^* \\ s_3 & s_4 & s_2 & -s_1 \end{bmatrix}$ |
| $\begin{bmatrix} s_1 & s_3 & s_2 & s_4 \\ -s_3^* & s_1^* & -s_4^* & s_2^* \\ -s_2 & s_4 & s_1 & -s_3 \\ -s_4^* & -s_2^* & s_3^* & s_1^* \end{bmatrix}$ | $\begin{bmatrix} s_1 & -s_4 & s_3 & s_2 \\ s_4^* & s_1^* & -s_2^* & s_3^* \\ -s_3^* & s_2^* & s_1^* & s_4^* \\ s_2 & s_3 & s_4 & -s_1 \end{bmatrix}$ |
| $\begin{bmatrix} s_1 & -s_3 & s_2 & s_4 \\ s_3^* & s_1^* & -s_4^* & s_2^* \\ -s_2 & s_4 & s_1 & s_3 \\ -s_4^* & -s_2^* & -s_3^* & s_1^* \end{bmatrix}$ | $\begin{bmatrix} s_1 & s_4 & s_3 & s_2 \\ -s_4^* & s_1^* & -s_2^* & s_3^* \\ -s_3^* & s_2^* & s_1^* & -s_4^* \\ s_2 & s_3 & -s_4 & -s_1 \end{bmatrix}$ |
| $\begin{bmatrix} s_1 & s_2 & s_4 & s_3 \\ -s_2^* & s_1^* & -s_3^* & s_4^* \\ -s_4 & s_3 & s_1 & -s_2 \\ -s_4^* & -s_3^* & s_2^* & s_1^* \end{bmatrix}$ | $\begin{bmatrix} s_1 & -s_2 & s_4 & s_3 \\ s_2^* & s_1^* & -s_3^* & s_4^* \\ -s_4^* & s_3^* & s_1^* & s_2^* \\ s_3 & s_4 & s_2 & -s_1 \end{bmatrix}$ |
| $\begin{bmatrix} s_1 & -s_2 & s_4 & s_3 \\ s_2^* & s_1^* & -s_3^* & s_4^* \\ -s_4 & s_3 & s_1 & s_2 \\ -s_4^* & -s_3^* & -s_2^* & s_1^* \end{bmatrix}$ | $\begin{bmatrix} s_1 & s_2 & s_4 & s_3 \\ -s_2^* & s_1^* & -s_3^* & s_4^* \\ -s_4^* & s_3^* & s_1^* & -s_2^* \\ s_3 & s_4 & -s_2 & -s_1 \end{bmatrix}$ |

Non-Full-Rate Orthogonal Space-Time Block Code:

Although the full-rate orthogonal codebook over the field of complex numbers has only N=2 dimensions and the full-rate codebook over the field of real numbers has N=2, 4, or 8 dimensions, if a full-rate requirement can be reduced, that is, R≠1, there are other orthogonal codebooks regardless of the field of complex numbers or the field of real numbers.

The codebook over the field of real numbers is also used as an example. In this case, the dimensions of the codebook may be extended to n=3, 5, 6, or 7:

$$\mathcal{G}_3 = \begin{pmatrix} s_1 & s_2 & s_3 \\ -s_2 & s_1 & -s_4 \\ -s_3 & s_4 & s_1 \\ -s_4 & -s_3 & s_2 \end{pmatrix}; \text{ and }$$

$$\mathcal{G}_6 = \begin{pmatrix} s_1 & s_2 & s_3 & s_4 & s_5 & s_6 \\ -s_2 & s_1 & s_4 & -s_3 & s_6 & -s_5 \\ -s_3 & -s_4 & s_1 & s_2 & s_7 & s_8 \\ -s_4 & s_3 & -s_2 & s_1 & s_8 & -s_7 \\ -s_5 & -s_6 & -s_7 & -s_8 & s_1 & s_2 \\ -s_6 & s_5 & -s_8 & s_7 & -s_2 & s_1 \\ -s_7 & s_8 & s_5 & -s_6 & -s_3 & s_4 \\ -s_8 & -s_7 & s_6 & s_5 & -s_4 & -s_3 \end{pmatrix}.$$

Similarly, dimensions of a non-full-rate codebook over the field of complex numbers may also be extended to n≥2 dimensions. In addition, it has been proved theoretically that a maximum rate of a non-full-rate orthogonal codebook is $$R_{max} = \frac{m+1}{2m},$$

where a quantity of transmit antennas is n=2m or n=2m+1. Several common codebooks with a rate $$R = \frac{1}{2}$$

are as follows:

$$\mathcal{G}^3_{c,\frac{1}{2}} = \begin{pmatrix} s_1 & s_2 & s_3 \\ -s_2 & s_1 & -s_4 \\ -s_3 & s_4 & s_1 \\ -s_4 & -s_3 & s_2 \\ s_1^* & s_2^* & s_3^* \\ -s_2^* & s_1^* & -s_4^* \\ -s_3^* & s_4^* & s_1^* \\ -s_4^* & -s_3^* & s_2^* \end{pmatrix}; \text{ and }$$

$$\mathcal{G}^3_{c,\frac{1}{2}} = \begin{pmatrix} s_1 & s_2 & s_3 & s_4 \\ -s_2 & s_1 & -s_4 & s_3 \\ -s_3 & s_4 & s_1 & -s_2 \\ -s_4 & -s_3 & s_2 & s_1 \\ s_1^* & s_2^* & s_3^* & s_4^* \\ -s_2^* & s_1^* & -s_4^* & s_3^* \\ -s_3^* & s_4^* & s_1^* & -s_2^* \\ -s_4^* & -s_3^* & s_2^* & s_1^* \end{pmatrix}.$$

Codebooks with a rate $$R = \frac{3}{4}$$

are as follows:

$$\mathcal{G}^3_{c,\frac{3}{4}} = \begin{pmatrix} s_1 & s_2 & \frac{s_3}{\sqrt{2}} \\ -s_2^* & s_1^* & \frac{s_3}{\sqrt{2}} \\ \frac{s_3^*}{\sqrt{2}} & \frac{s_3^*}{\sqrt{2}} & \frac{(-s_1 - s_1^* + s_2 - s_2^*)}{2} \\ \frac{s_3^*}{\sqrt{2}} & -\frac{s_3^*}{\sqrt{2}} & \frac{(s_2 + s_2^* + s_1 - s_1^*)}{2} \end{pmatrix}; \text{ and }$$

$$\mathcal{G}^3_{c,\frac{3}{4}} = \begin{pmatrix} s_1 & s_2 & \frac{s_3}{\sqrt{2}} & \frac{s_3}{\sqrt{2}} \\ -s_2^* & s_1^* & \frac{s_3}{\sqrt{2}} & -\frac{s_3}{\sqrt{2}} \\ \frac{s_3^*}{\sqrt{2}} & \frac{s_3^*}{\sqrt{2}} & \frac{(-s_1 - s_1^* + s_2 - s_2^*)}{2} & \frac{(-s_2 - s_2^* + s_1 - s_1^*)}{2} \\ \frac{s_3^*}{\sqrt{2}} & -\frac{s_3^*}{\sqrt{2}} & \frac{(s_2 + s_2^* + s_1 - s_1^*)}{2} & -\frac{(s_1 + s_1^* + s_2 - s_2^*)}{2} \end{pmatrix}.$$

In addition, the non-full-rate orthogonal codebook may also be obtained by zero padding in some space-time positions, as shown below:

$$\mathcal{G}^3_{c,\frac{3}{4}} = \begin{pmatrix} s_3 & 0 & s_2 & s_1 \\ 0 & s_3 & s_1^* & -s_2^* \\ s_2^* & s_1 & -s_3^* & 0 \\ s_1^* & -s_2 & 0 & -s_3^* \end{pmatrix}.$$

New Space-Time Block Code (NSTBC):

In recent years, with deep research on backscatter communication, some researchers put forward a concept of backscatter diversity and design a corresponding space-time block code codeword. Based on this type of codeword, hardware implementation complexity is reduced, and a probability of error detection is reduced by optimizing a codebook of conventional Alamouti codes.

Two-antenna transmit diversity is used as an example, that is, a codeword matrix S in this case has 2×2 dimensions, and its coding structure is:

$$S_2 = \begin{bmatrix} s_1 & s_2^* \\ s_2 & -s_1^* \end{bmatrix}.$$

According to the foregoing coding structure, it is assumed that in a current symbol period, a symbol transmitted on antenna 1 is denoted as $s_1$, and that a symbol transmitted on antenna 2 is denoted as $s_2^*$. In a next symbol period, a symbol transmitted on antenna 1 is denoted as $s_2$, and a symbol transmitted on antenna 2 is denoted as $(-s_1^*)$. According to a definition of an OSTBC codeword, $S_2$ belongs to the OSTBC codeword, and therefore can achieve a full diversity gain and full rate transmission. The following analyzes differences between this type of codeword and the conventional Alamouti code in backscatter communication.

Assuming that transmission is performed based on a binary phase shift keying (BPSK) modulation symbol, according to a backscatter communication mapping principle, mapping rules for symbols 0 and 1 and reflection coefficients are:

$$\begin{cases} 0 \Leftrightarrow \Gamma_1 = |\Gamma|e^{j\theta} \\ 1 \Leftrightarrow \Gamma_2 = |\Gamma|e^{j(\theta+\pi)} \end{cases}.$$

In other words, the symbols 0 and 1 are represented by controlling two phase-inverted load impedances. Therefore, a coding table for transmitting different symbols simultaneously on two antennas by using a diversity encoding codeword $S_2$ is Table 4. For comparison, Table 5 and Table 6 also provide coding tables for transmitting different symbols simultaneously on two antennas by using an Alamouti codeword and an extended Alamouti codeword. The extended Alamouti codeword is:

$$\begin{bmatrix} s_1 & s_2 \\ s_2^* & -s_1^* \end{bmatrix}.$$

Specifically, Table 4 is a two-antenna transmit diversity coding table of NSTBC space-time block codes, Table 5 is a two-antenna transmit diversity coding table of Alamouti space-time block codes, and Table 6 is an extended two-antenna transmit diversity coding table of Alamouti space-time block codes.

TABLE 4

| 00 | Antenna 1 | Antenna 2 | 01 | Antenna 1 | Antenna 2 |
|---|---|---|---|---|---|
| t | $|\Gamma|e^{j\theta}$ | $|\Gamma|e^{-j\theta}$ | t | $|\Gamma|e^{j\theta}$ | $|\Gamma|e^{-j(\theta+\pi)}$ |
| t + T | $|\Gamma|e^{j\theta}$ | $|\Gamma|e^{-j(\theta+\pi)}$ | t + T | $|\Gamma|e^{j(\theta+\pi)}$ | $|\Gamma|e^{-j(\theta+\pi)}$ |

| 10 | Antenna 1 | Antenna 2 | 11 | Antenna 1 | Antenna 2 |
|---|---|---|---|---|---|
| t | $|\Gamma|e^{j(\theta+\pi)}$ | $|\Gamma|e^{-j\theta}$ | t | $|\Gamma|e^{j(\theta+\pi)}$ | $|\Gamma|e^{-j(\theta+\pi)}$ |
| t + T | $|\Gamma|e^{j\theta}$ | $|\Gamma|e^{-j\theta}$ | t + T | $|\Gamma|e^{j(\theta+\pi)}$ | $|\Gamma|e^{-j\theta}$ |

TABLE 5

| 00 | Antenna 1 | Antenna 2 | 01 | Antenna 1 | Antenna 2 |
|---|---|---|---|---|---|
| t | $|\Gamma|e^{j\theta}$ | $|\Gamma|e^{j\theta}$ | t | $|\Gamma|e^{j\theta}$ | $|\Gamma|e^{j(\theta+\pi)}$ |
| t + T | $|\Gamma|e^{-j(\theta+\pi)}$ | $|\Gamma|e^{-j\theta}$ | t + T | $|\Gamma|e^{-j(\theta+\pi)}$ | $|\Gamma|e^{-j\theta}$ |

| 10 | Antenna 1 | Antenna 2 | 11 | Antenna 1 | Antenna 2 |
|---|---|---|---|---|---|
| t | $|\Gamma|e^{j(\theta+\pi)}$ | $|\Gamma|e^{j\theta}$ | t | $|\Gamma|e^{j(\theta+\pi)}$ | $|\Gamma|e^{j(\theta+\pi)}$ |
| t + T | $|\Gamma|e^{-j(\theta+\pi)}$ | $|\Gamma|e^{-j(\theta+\pi)}$ | t + T | $|\Gamma|e^{-j\theta}$ | $|\Gamma|e^{-j(\theta+\pi)}$ |

TABLE 6

| 00 | Antenna 1 | Antenna 2 | 01 | Antenna 1 | Antenna 2 |
|---|---|---|---|---|---|
| t | $|\Gamma|e^{j\theta}$ | $|\Gamma|e^{j\theta}$ | t | $|\Gamma|e^{j\theta}$ | $|\Gamma|e^{j(\theta+\pi)}$ |
| t + T | $|\Gamma|e^{-j\theta}$ | $|\Gamma|e^{-j(\theta+\pi)}$ | t + T | $|\Gamma|e^{-j(\theta+\pi)}$ | $|\Gamma|e^{-j(\theta+\pi)}$ |

| 10 | Antenna 1 | Antenna 2 | 11 | Antenna 1 | Antenna 2 |
|---|---|---|---|---|---|
| t | $|\Gamma|e^{j(\theta+\pi)}$ | $|\Gamma|e^{j\theta}$ | t | $|\Gamma|e^{j(\theta+\pi)}$ | $|\Gamma|e^{j(\theta+\pi)}$ |
| t + T | $|\Gamma|e^{-j\theta}$ | $|\Gamma|e^{-j\theta}$ | t + T | $|\Gamma|e^{-j(\theta+\pi)}$ | $|\Gamma|e^{-j\theta}$ |

As can be learned according to Table 4, based on the designed codebooks of NSTBC space-time block codes, antenna 1 requires only two coefficients $|\Gamma|e^{j\theta}$ and $[\Gamma]e^{j(\theta+\pi)}$; and antenna 2 also requires only two coefficients $|\Gamma|e^{-j\theta}$ and $|\Gamma|e^{-j(\theta+\pi)}$, that is, only two types of load impedances are required on each antenna. As can be learned according to Table 5 and Table 6, based on the Alamouti codeword and the extended Alamouti codeword, both antenna 1 and antenna 2 require four coefficients $|\Gamma|e^{j\theta}$, $|\Gamma|e^{j(\theta+\pi)}$, $|\Gamma|e^{-j\theta}$, and $|\Gamma|e^{-j(\theta+\pi)}$, that is, four types of load impedances are required on each antenna. The same method may be extended to scenarios with four or more antennas.

The full-rate orthogonal codebook can achieve a full rate while achieving a full diversity gain. However, so far, for this type of codebook, the full-rate orthogonal codebook over the field of complex numbers has only N=2 dimensions, and the full-rate codebook over the field of real numbers has only N=2, 4, or 8 dimensions. The full-rate quasi-orthogonal codebook extends the dimensions of the full-rate orthogonal codebook. In particular, this type of codebook can extend dimensions to N≥2 over the field of complex numbers and achieve a diversity gain slightly worse than the full diversity gain. However, this type of codebook has the following problem: Because orthogonality of the codebook is destroyed, the receive end cannot implement maximum likelihood detection through simple linear processing, processing complexity of the receive end is increased, and communication performance is degraded. The non-full-rate orthogonal codebook ensures orthogonality of the codebook by reducing frequency band utilization or the rate requirement, but the conventional non-full-rate orthogonal codebook is designed for conventional active radio frequency communication, without considering modulation characteristics and implementation complexity of passive terminals similar to backscatter communication terminals. Although the novel NSTBC codebook takes modulation characteristics and implementation complexity of passive terminals such as backscatter communication terminals into account, the existing NSTBC codebook has only N=2 dimensions.

Backscatter communication controls an amplitude or a phase of a signal by changing a load impedance. Considering other non-ideal factors in a modulation circuit for backscatter communication, there are more or less errors in an amplitude or a phase of an output signal. However, as long as these signal errors are within a resolvable range, there is no impact on signal demodulation. Therefore, if there are fewer load impedances to be changed on each antenna, a tolerable error may be greater, and a probability of error detection is lower. However, none of the conventional full-rate orthogonal codebook, full-rate quasi-orthogonal codebook, and non-full-rate orthogonal codebook take these problems of modulation implementation complexity into account.

Therefore, in the solutions of the present invention, the non-full-rate orthogonal codebook with N≥2 codebook dimensions are redesigned by combining the structures of the non-full-rate orthogonal codebook and the NSTBC codebook to extend the dimensions of the orthogonal codebook and reduce modulation implementation complexity.

An encoding method provided in the embodiments of this application is hereinafter described in detail by using some embodiments and application scenarios thereof with reference to the accompanying drawings.

Figure 2:
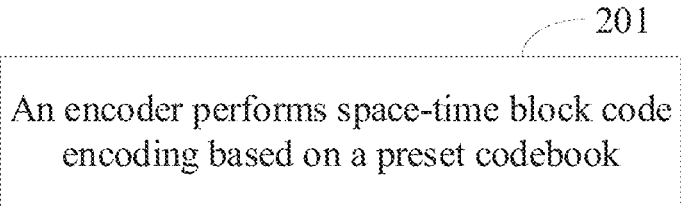
FIG. 2 is a schematic flowchart of an encoding method according to an embodiment of this application.

Referring to FIG. 2, an embodiment of this application provides an encoding method. The method is performed by an encoder. The encoder may be a terminal device or a network-side device. The method includes the following step.

Step 201: An encoder performs space-time block code encoding on data based on a preset codebook.

In this embodiment of this application, the preset codebook is a non-full-rate orthogonal codebook over a field of complex numbers in which an Alamouti codebook subblock in the codebook is replaced with a new space-time block code NSTBC codebook sub-block, and columns of the preset codebook are pairwise orthogonal.

It should be noted that the performing space-time block code encoding on data may be performing encoding processing on to-be-transmitted original data.

In this embodiment of this application, the Alamouti codebook sub-block in the non-full-rate orthogonal codebook over the field of complex numbers is replaced with the NSTBC codebook sub-block. On one hand, based on the non-full-rate orthogonal codebook over the field of complex numbers, by reducing a rate requirement, orthogonality of the codebook is ensured, processing complexity of a receive end is reduced, and degradation of communication performance is avoided. On the other hand, based on an NSTBC codebook, a quantity or types of load impedances on some antennas can be reduced, and a probability of error detection can be effectively reduced, while a diversity gain is ensured.

Optionally, the preset codebook may be referred to as a non-full-rate orthogonal codebook over the field of complex numbers.

In this embodiment of this application, the non-full-rate orthogonal codebook over the field of complex numbers with low implementation complexity is designed, a codebook structure is redesigned on a basis of a conventional non-full-rate orthogonal codebook over the field of complex numbers, and it is ensured that the columns of the designed codebook are pairwise orthogonal and that a quantity of types of matched impedances corresponding to some antennas is reduced, thereby reducing system implementation complexity and effectively reducing the probability of error detection.

The following describes characteristics of the constructed non-full-rate orthogonal codebook over the field of complex numbers in this application.

(1) In a specific implementation, a structure of the combined NSTBC codebook is:

$$S = \begin{bmatrix} s_{12} & s_{34}^* \\ s_{34} & -s_{12}^* \end{bmatrix},$$

where S is the NSTBC codebook, and elements in S include $s_{12}$, $s_{34}$, $s_{34}^*$, and $-s_{12}^*$; $s_{12}$ is a first basic element, $s_{34}$ is a second basic element, $-s_{12}$ is a first generation element, and $s_{34}^*$ is a second generation element; and $s_{12}$, $s_{34}$, $s_{34}^*$, and $-s_{12}^*$ meet:
the first generation element is an opposite number of a conjugate operation result of the first basic element, the second generation element is a conjugate operation result of the second basic element, and the first basic element, the second basic element, the first generation element, and the second generation element are complex numbers or block matrices.

Specifically, in a case that N is equal to 2, N is a quantity of transmit antennas, $$s_{12}, s_{34}, s_{34}^*,$$

and $$-s_{12}^*$$

are all complex numbers, $$s_{34}^*$$

is a conjugate complex number of $s_{34}$, and $$-s_{12}^*$$

is an opposite number of a conjugate complex number of $s_{12}$.

In a specific implementation, a structure of the preset codebook is:

$$S_c = \begin{pmatrix} s_1 & s_2^* & \dots & \# \\ s_2 & -s_1^* & \dots & \# \\ \vdots & \vdots & \ddots & \vdots \\ \# & \# & \dots & \# \end{pmatrix},$$

where
$S_c$ is the preset codebook, dimensions of $S_c$ are (p×n), n is a quantity of transmit antennas, p is a symbol period, $s_1$ and $$s_2^*$$

are transmitted symbols that are on a first transmit antenna and a second transmit antenna and that are obtained by the encoder through encoding in a first symbol period, $s_2$ and $$-s_1^*$$

are transmitted symbols that are on the first transmit antenna and the second transmit antenna and that are obtained by the encoder through encoding in a second symbol period, the symbol $$s_2^*$$

is a conjugate of the symbol $s_2$, the symbol $$-s_1^*$$

is a negative conjugate of the symbol $s_1$, and # is another symbol over the field of complex numbers in the preset codebook.

In this embodiment of this application, the Alamouti codebook sub-block in the non-full-rate codebook over the field of complex numbers is replaced with the NSTBC codebook sub-block. Therefore, it is ensured that the designed codebook can reduce the quantity of types of load impedances corresponding to some antennas.

(2) In a specific implementation, columns $B_a$ and $B_b$ of the preset codebook meet:

$$B_a^T \cdot B_b = 0;$$

and
the preset codebook meets:

$$S_c^H \cdot S_c = \alpha \times I_{n \times n},$$

where
a and b are integers, $1 \le a$, $b \le n$, and $a \ne b$; and $$B_a^T$$

is a transpose of $B_a$, $$S_c^H$$

is a conjugate transpose of $S_c$, and $\alpha$ is a coefficient factor related to a symbol in the preset codebook. For example, $$\alpha = \sum_{a=1}^{n} B_a^H B_a.$$

In this embodiment of this application, the another symbol # over the field of complex numbers in the non-full-rate orthogonal codebook over the field of complex numbers is designed to ensure that the columns of the codebook are pairwise orthogonal, that is, compliant with a construction principle of a generalized orthogonal codebook over the field of complex numbers.

(3) In a specific implementation, the another symbol # over the field of complex numbers in the preset codebook meets:

$$\# \notin \{s_1, s_1^*, -s_1, -s_1^*, s_2, s_2^*, -s_2, -s_2^*\}.$$

In this embodiment of this application, the symbol # cannot be the same as symbols transmitted by antennas 1 and 2 in the first symbol period and the second symbol period, and a conjugate, a negative number, or a negative conjugate of the symbol.

(4) In a specific implementation, a rate R of the preset codebook meets:

$$R \le \frac{m+1}{2m},$$

that is, a maximum rate of the non-full-rate orthogonal codebook over the field of complex numbers may reach $$R = \frac{m+1}{2m},$$

where
n=2m or n=2m+1, n is the quantity of transmit antennas, and m is an integer greater than or equal to 1.

In this solution, the characteristic (1) of codebook construction ensures that the designed codebook can reduce the quantity of types of matched impedances corresponding to some antennas, thereby reducing hardware implementation complexity and the probability of detection error; the characteristic (2) of codebook construction ensures that the designed codebook is orthogonal, so that the receive end can implement a maximum likelihood detection algorithm only by performing simple linear combination processing; and the characteristic (3) of codebook construction ensures that the maximum rate of the codebook can reach $$R = \frac{m+1}{2m},$$

where n=2m or n=2m+1, and n is the quantity of transmit antennas.

The following describes several specific implementation examples of a non-full-rate orthogonal codebook over a field of complex numbers:

Example 1: Rate $$R = \frac{3}{4},$$

n=3, and codebook structure 1. It should be noted that a scenario of $$R = \frac{3}{4}$$

and n=3 is provided herein, where the rate R is less than or equal to a maximum rate.

When the rate is $$R = \frac{3}{4},$$

and a quantity n of transmit antennas is equal to 3, a codebook structure of a codebook $$S_{c, \frac{3}{4}}^{3,1}$$

designed in this solution is redesigned on a basis of a conventional codebook $$\mathcal{G}_{c, \frac{3}{4}}^{3},$$

that is, in the codebook structure, an Alamouti codebook is replaced with an NSTBC codebook. It is ensured that columns of the designed codebook are pairwise orthogonal and that a quantity of types of matched impedances corresponding to the antennas are reduced. Because the columns of the codebook $$S^{3,1}_{c,\frac{3}{4}}$$

are pairwise orthogonal and compliant with a construction principle of a generalized orthogonal codebook over a field of complex numbers, it is ensured that a receive end can implement a maximum likelihood detection algorithm only by performing simple linear combination processing.

$$S^{3,1}_{c,\frac{3}{4}} = \begin{pmatrix} s_1 & s_2^* & \frac{s_3^*}{\sqrt{2}} \\ s_2 & -s_1^* & \frac{s_3^*}{\sqrt{2}} \\ \frac{s_3^*}{\sqrt{2}} & -\frac{s_3^*}{\sqrt{2}} & \frac{(-s_1 - s_1^* - s_2 + s_2^*)}{2} \\ \frac{s_3^*}{\sqrt{2}} & \frac{s_3^*}{\sqrt{2}} & \frac{(-s_2 - s_2^* - s_1 + s_1^*)}{2} \end{pmatrix}.$$

Example 2: Rate $$R = \frac{3}{4},$$

n=3, and codebook structure 2.
When the rate is $$R = \frac{3}{4},$$

and a quantity n or transmit antennas is equal to 3, a codebook structure of a codebook $$S^{3,2}_{c,\frac{3}{4}}$$

designed in this solution is redesigned on a basis of a conventional codebook $$\mathcal{G}^3_{c,\frac{3}{4}},$$

that is, in the codebook structure, an Alamouti codebook is replaced with an NSTBC codebook. It is ensured that columns of the designed codebook are pairwise orthogonal and that a quantity or types of matched impedances corresponding to the antennas are reduced. Because the columns of the codebook $$S^{3,2}_{c,\frac{3}{4}}$$

are pairwise orthogonal and compliant with a construction principle of a generalized orthogonal codebook over a field of complex numbers, it is ensured that a receive end can implement a maximum likelihood detection algorithm only by performing simple linear combination processing.

$$S^{3,2}_{c,\frac{3}{4}} = \begin{pmatrix} s_1 & s_2^* & -\frac{s_3^*}{\sqrt{2}} \\ s_2 & -s_1^* & \frac{s_3^*}{\sqrt{2}} \\ \frac{s_3^*}{\sqrt{2}} & -\frac{s_3^*}{\sqrt{2}} & \frac{(-s_2 - s_2^* + s_1 - s_1^*)}{2} \\ \frac{s_3^*}{\sqrt{2}} & \frac{s_3^*}{\sqrt{2}} & \frac{(s_1 + s_1^* - s_2 + s_2^*)}{2} \end{pmatrix}.$$

Example 3: Rate $$R = \frac{3}{4},$$

n=3, and codebook structure 3.
When the rate is $$R = \frac{3}{4},$$

and a quantity n of transmit antennas is equal to 3, a codebook structure of a codebook $$S^{3,3}_{c,\frac{3}{4}}$$

designed in this solution is also redesigned on a basis of a conventional codebook $$\mathcal{G}^3_{c,\frac{3}{4}},$$

that is, in the codebook structure, an Alamouti codebook is replaced with an NSTBC codebook. It is ensured that columns of the designed codebook are pairwise orthogonal and that a quantity or types of matched impedances corresponding to the antennas are reduced. Because the columns of the codebook $$S^{3,3}_{c,\frac{3}{4}}$$

are pairwise orthogonal and compliant with a construction principle of a generalized orthogonal codebook over a field of complex numbers, it is ensured that a receive end can implement a maximum likelihood detection algorithm only by performing simple linear combination processing.

$$S^{3,3}_{c,\frac{3}{4}} = \begin{pmatrix} s_1 & s_2^* & \frac{s_3}{\sqrt{2}} \\ s_2 & -s_1^* & \frac{s_3}{\sqrt{2}} \\ \frac{s_3^*}{\sqrt{2}} & -\frac{s_3^*}{\sqrt{2}} & \frac{(-s_1 - s_1^* + s_2 - s_2^*)}{2} \\ \frac{s_3^*}{\sqrt{2}} & \frac{s_3^*}{\sqrt{2}} & \frac{(-s_2 - s_2^* + s_1 - s_1^*)}{2} \end{pmatrix}.$$

Example 4: Rate $$R = \frac{3}{4},$$

n=3, and codebook structure 4.

When the rate is $$R = \frac{3}{4},$$

and a quantity n of transmit antennas is 3, a codebook structure of a codebook $$S^{3,4}_{c,\frac{3}{4}}$$

designed in this solution is also redesigned on a basis of a conventional codebook $$\mathcal{G}^{3}_{c,\frac{3}{4}},$$

that is, in the codebook structure, an Alamouti codebook is replaced with an NSTBC codebook. It is ensured that columns of the designed codebook are pairwise orthogonal and that a quantity or types of matched impedances corresponding to the antennas are reduced. Because the columns of the codebook $$S^{3,4}_{c,\frac{3}{4}}$$

are pairwise orthogonal and compliant with a construction principle of a generalized orthogonal codebook over a field of complex numbers, it is ensured that a receive end can implement a maximum likelihood detection algorithm only by performing simple linear combination processing.

$$S^{3,4}_{c,\frac{3}{4}} = \begin{pmatrix} s_1 & s_2^* & -\frac{s_3}{\sqrt{2}} \\ s_2 & -s_1^* & \frac{s_3}{\sqrt{2}} \\ \frac{s_3^*}{\sqrt{2}} & -\frac{s_3^*}{\sqrt{2}} & \frac{(-s_2 - s_2^* - s_1 + s_1^*)}{2} \\ \frac{s_3^*}{\sqrt{2}} & \frac{s_3^*}{\sqrt{2}} & \frac{(s_1 + s_1^* + s_2 - s_2^*)}{2} \end{pmatrix}.$$

Example 5: Rate $$R = \frac{3}{4},$$

n=4, and codebook structure 1.

When the rate is $$R = \frac{3}{4},$$

and a quantity n or transmit antennas is 4, a codebook structure of a codebook $$S^{4,1}_{c,\frac{3}{4}}$$

designed in this solution is redesigned on a basis of a conventional codebook $$\mathcal{G}^{4}_{c,\frac{3}{4}},$$

that is, in the codebook structure, an Alamouti codebook is replaced with an NSTBC codebook. It is ensured that columns of the designed codebook are pairwise orthogonal and that a quantity or types of matched impedances on the antennas are reduced. Because the columns of the codebook $$S^{4,1}_{c,\frac{3}{4}}$$

are pairwise orthogonal and compliant with a construction principle of a generalized orthogonal codebook over a field of complex numbers, it is ensured that a receive end can implement a maximum likelihood detection algorithm only by performing simple linear combination processing.

$$S^{4,1}_{c,\frac{3}{4}} = \begin{pmatrix} s_1 & s_2^* & \frac{s_3^*}{\sqrt{2}} & -\frac{s_3^*}{\sqrt{2}} \\ s_2 & -s_1^* & \frac{s_3^*}{\sqrt{2}} & \frac{s_3^*}{\sqrt{2}} \\ \frac{s_3^*}{\sqrt{2}} & -\frac{s_3^*}{\sqrt{2}} & \frac{(-s_1 - s_1^* - s_2 + s_2^*)}{2} & \frac{(-s_2 - s_2^* + s_1 - s_1^*)}{2} \\ \frac{s_3^*}{\sqrt{2}} & \frac{s_3^*}{\sqrt{2}} & \frac{(-s_2 - s_2^* - s_1 + s_1^*)}{2} & \frac{(s_1 + s_1^* - s_2 + s_2^*)}{2} \end{pmatrix}.$$

Example 6: Rate $$R = \frac{3}{4},$$

n=4, and codebook structure 2.

When the rate is $$R = \frac{3}{4},$$

and a quantity n of transmit antennas is 4, a codebook structure of a codebook $$S^{4,2}_{c,\frac{3}{4}}$$

designed in this solution is also redesigned on a basis of a conventional codebook $$\mathcal{G}^4_{c,\frac{3}{4}},$$

that is, in the codebook structure, an Alamouti codebook is replaced with an NSTBC codebook. It is ensured that columns of the designed codebook are pairwise orthogonal and that a quantity or types of matched impedances on the antennas are reduced. Because the columns of the codebook $$S^{4,2}_{c,\frac{3}{4}}$$

are pairwise orthogonal and compliant with a construction principle of a generalized orthogonal codebook over a field of complex numbers, it is ensured that a receive end can implement a maximum likelihood detection algorithm only by performing simple linear combination processing.

$$S^{4,2}_{c,\frac{3}{4}} = \begin{pmatrix} s_1 & s_2^* & \frac{s_3}{\sqrt{2}} & -\frac{s_3}{\sqrt{2}} \\ s_2 & -s_1^* & \frac{s_3}{\sqrt{2}} & \frac{s_3}{\sqrt{2}} \\ \frac{s_3^*}{\sqrt{2}} & -\frac{s_3^*}{\sqrt{2}} & \frac{(-s_1 - s_1^* + s_2 - s_2^*)}{2} & \frac{(-s_2 - s_2^* - s_1 + s_1^*)}{2} \\ \frac{s_3^*}{\sqrt{2}} & \frac{s_3^*}{\sqrt{2}} & \frac{(-s_2 - s_2^* + s_1 - s_1^*)}{2} & \frac{(s_1 + s_1^* + s_2 - s_2^*)}{2} \end{pmatrix}.$$

The encoding method provided in this embodiment of this application may be performed by an encoding apparatus. An encoding apparatus provided in an embodiment of this application is described by assuming that the encoding apparatus performs the encoding method in this embodiment of this application.

Figure 3:
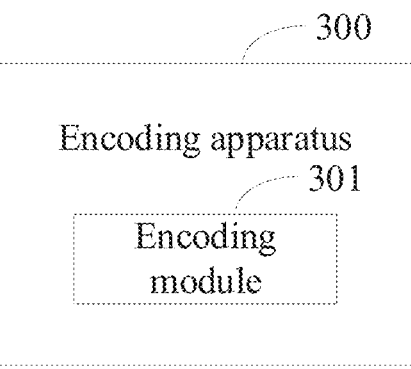
FIG. 3 is a schematic diagram of a structure of an encoding apparatus according to an embodiment of this application.

Referring to FIG. 3, an embodiment of this application provides an encoding apparatus, including:

an encoding module, configured to perform, by an encoder, space-time block code encoding on data based on a preset codebook, where the preset codebook is a non-full-rate orthogonal codebook over a field of complex numbers in which an Alamouti codebook sub-block in the codebook is replaced with an NSTBC codebook sub-block, and columns of the preset codebook are pairwise orthogonal.

In a specific implementation, a structure of an NSTBC codebook is:

$$S = \begin{bmatrix} s_{12} & s_{34}^* \\ s_{34} & -s_{12}^* \end{bmatrix},$$

where

S is the NSTBC codebook, and elements in S include $$s_{12}, s_{34}, s_{34}^*,$$

and $$-s_{12}^*;$$

$s_{12}$ is a first basic element, $s_{34}$ is a second basic element, $$-s_{12}^*$$

is a first generation element, and $$s_{34}^*$$

is a second generation element; and $$s_{12}, s_{34}, s_{34}^*,$$

and $$-s_{12}^*$$

meet:

in a case that N is equal to 2, N is a quantity of transmit antennas, $s_{12}$, $s_{34}$, $$s_{34}^*,$$

and $$-s_{12}^*$$

are all complex numbers, $$s_{34}^*$$

is a conjugate complex number of $s_{34}$, and $$-s_{12}^*$$

is an opposite number of a conjugate complex number of $s_{12}$.

In a specific implementation, a structure of the preset codebook is:

$$S_c = \begin{pmatrix} s_1 & s_2^* & \dots & \# \\ s_2 & -s_1^* & \dots & \# \\ \vdots & \vdots & \ddots & \vdots \\ \# & \# & \dots & \# \end{pmatrix},$$

where $S_c$ is the preset codebook, dimensions of $S_c$ are (p×n), n is a quantity of transmit antennas, p is a symbol period, $s_1$ and $$s_2^*$$

are transmitted symbols that are on a first transmit antenna and a second transmit antenna and that are obtained by the encoder through encoding in a first symbol period, $s_2$ and $$-s_1^*$$

are transmitted symbols that are on the first transmit antenna and the second transmit antenna and that are obtained by the encoder through encoding in a second symbol period, the symbol $$s_2^*$$

is a conjugate of the symbol $s_2$, the symbol $$-s_1^*$$

is a negative conjugate of the symbol $s_1$, and # is another symbol over the field of complex numbers in the preset codebook.

In a specific implementation, columns $B_a$ and $B_b$ of the preset codebook meet:

$$B_a^T \cdot B_b = 0;$$

and the preset codebook meets:

$$S_c^H \cdot S_c = \alpha \times I_{n \times n},$$

where a and b are integers, 1≤a, b≤n, and a≠b; and $$B_a^T$$

is a transpose of $B_a$, $$S_c^H$$

is a conjugate transpose of $S_c$, and $\alpha$ is a coefficient factor related to a symbol in the preset codebook. For example, $$\alpha = \sum_{a=1}^{n} B_a^H B_a.$$

In a specific implementation, the another symbol # over the field of complex numbers in the preset codebook meets:

$$\# \notin \{s_1, s_1^*, -s_1, -s_1^*, s_2, s_2^*, -s_2, -s_2^*\}.$$

In a specific implementation, a rate R of the preset codebook meets:

$$R \leq \frac{m+1}{2m},$$

where n=2m or n=2m+1, n is the quantity of transmit antennas, and m is an integer greater than or equal to 1.

In a specific implementation, in a case of $$R = \frac{3}{4}$$

and n=3, the structure of the preset codebook is:

$$S_{c,\frac{3}{4}}^{3,1} = \begin{pmatrix} s_1 & s_2^* & \dfrac{s_3^*}{\sqrt{2}} \\ s_2 & -s_1^* & \dfrac{s_3^*}{\sqrt{2}} \\ \dfrac{s_3^*}{\sqrt{2}} & -\dfrac{s_3^*}{\sqrt{2}} & \dfrac{(-s_1 - s_1^* - s_2 + s_2^*)}{2} \\ \dfrac{s_3^*}{\sqrt{2}} & \dfrac{s_3^*}{\sqrt{2}} & \dfrac{(-s_2 - s_2^* - s_1 + s_1^*)}{2} \end{pmatrix}; \text{ or}$$

the structure of the preset codebook is:

$$S_{c,\frac{3}{4}}^{3,2} = \begin{pmatrix} s_1 & s_2^* & -\dfrac{s_3^*}{\sqrt{2}} \\ s_2 & -s_1^* & \dfrac{s_3^*}{\sqrt{2}} \\ \dfrac{s_3^*}{\sqrt{2}} & -\dfrac{s_3^*}{\sqrt{2}} & \dfrac{(-s_2 - s_2^* + s_1 - s_1^*)}{2} \\ \dfrac{s_3^*}{\sqrt{2}} & \dfrac{s_3^*}{\sqrt{2}} & \dfrac{(s_1 + s_1^* - s_2 + s_2^*)}{2} \end{pmatrix}; \text{ or}$$

the structure of the preset codebook is:

$$S_{c,\frac{3}{4}}^{3,3} = \begin{pmatrix} s_1 & s_2^* & \dfrac{s_3}{\sqrt{2}} \\ s_2 & -s_1^* & \dfrac{s_3}{\sqrt{2}} \\ \dfrac{s_3^*}{\sqrt{2}} & -\dfrac{s_3^*}{\sqrt{2}} & \dfrac{\left(-s_1-s_1^*+s_2-s_2^*\right)}{2} \\ \dfrac{s_3^*}{\sqrt{2}} & \dfrac{s_3^*}{\sqrt{2}} & \dfrac{\left(-s_2-s_2^*+s_1-s_1^*\right)}{2} \end{pmatrix};$$

or the structure of the preset codebook is:

$$S_{c,\frac{3}{4}}^{3,4} = \begin{pmatrix} s_1 & s_2^* & -\dfrac{s_3}{\sqrt{2}} \\ s_2 & -s_1^* & \dfrac{s_3}{\sqrt{2}} \\ \dfrac{s_3^*}{\sqrt{2}} & -\dfrac{s_3^*}{\sqrt{2}} & \dfrac{\left(-s_2-s_2^*-s_1+s_1^*\right)}{2} \\ \dfrac{s_3^*}{\sqrt{2}} & \dfrac{s_3^*}{\sqrt{2}} & \dfrac{\left(s_1+s_1^*+s_2-s_2^*\right)}{2} \end{pmatrix}.$$

In a specific implementation, in a case of $$R = \frac{3}{4}$$

and n=4, the structure of the preset codebook is:

$$S_{c,\frac{3}{4}}^{4,1} = \begin{pmatrix} s_1 & s_2^* & \dfrac{s_3^*}{\sqrt{2}} & -\dfrac{s_3^*}{\sqrt{2}} \\ s_2 & -s_1^* & \dfrac{s_3^*}{\sqrt{2}} & \dfrac{s_3^*}{\sqrt{2}} \\ \dfrac{s_3^*}{\sqrt{2}} & -\dfrac{s_3^*}{\sqrt{2}} & \dfrac{\left(-s_1-s_1^*-s_2+s_2^*\right)}{2} & \dfrac{\left(-s_2-s_2^*+s_1-s_1^*\right)}{2} \\ \dfrac{s_3^*}{\sqrt{2}} & \dfrac{s_3^*}{\sqrt{2}} & \dfrac{\left(-s_2-s_2^*-s_1+s_1^*\right)}{2} & \dfrac{\left(s_1+s_1^*-s_2+s_2^*\right)}{2} \end{pmatrix};$$

or the structure of the preset codebook is:

$$S_{c,\frac{3}{4}}^{4,2} = \begin{pmatrix} s_1 & s_2^* & \dfrac{s_3}{\sqrt{2}} & -\dfrac{s_3}{\sqrt{2}} \\ s_2 & -s_1^* & \dfrac{s_3}{\sqrt{2}} & \dfrac{s_3}{\sqrt{2}} \\ \dfrac{s_3^*}{\sqrt{2}} & -\dfrac{s_3^*}{\sqrt{2}} & \dfrac{\left(-s_1-s_1^*+s_2-s_2^*\right)}{2} & \dfrac{\left(-s_2-s_2^*-s_1+s_1^*\right)}{2} \\ \dfrac{s_3^*}{\sqrt{2}} & \dfrac{s_3^*}{\sqrt{2}} & \dfrac{\left(-s_2-s_2^*+s_1-s_1^*\right)}{2} & \dfrac{\left(s_1+s_1^*+s_2-s_2^*\right)}{2} \end{pmatrix}.$$

In this embodiment of this application, the Alamouti codebook sub-block in the non-full-rate orthogonal codebook over the field of complex numbers is replaced with the NSTBC codebook sub-block. On one hand, based on the non-full-rate orthogonal codebook over the field of complex numbers, by reducing a rate requirement, orthogonality of the codebook is ensured, processing complexity of a receive end is reduced, and degradation of communication performance is avoided. On the other hand, based on the NSTBC codebook, a quantity or types of load impedances on some antennas can be reduced, and a probability of error detection can be effectively reduced, while a diversity gain is ensured.

The encoding apparatus in this embodiment of this application may be an electronic device, for example, an electronic device with an operating system, or may be a component in an electronic device, for example, an integrated circuit or a chip. The electronic device may be a terminal, or may be other devices than a terminal. For example, the terminal may include but is not limited to the foregoing illustrated type of the terminal. The other devices may be a server, a network attached storage (NAS), and the like. This is not specifically limited in this embodiment of this application.

The encoding apparatus provided in this embodiment of this application can implement each process implemented in the method embodiment in FIG. 2, with the same technical effect achieved. To avoid repetition, details are not described herein again.

Figure 4:
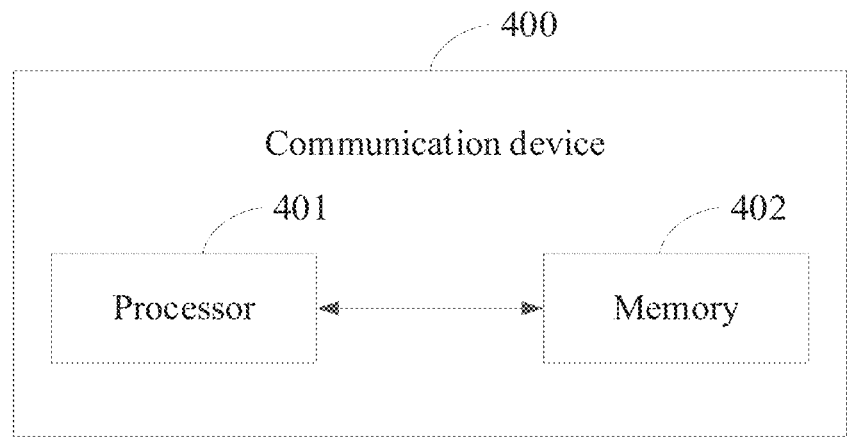
FIG. 4 is a schematic diagram of a structure of a communication device according to an embodiment of this application.

Optionally, as shown in FIG. 4, an embodiment of this application further provides a communication device 400, including a processor 401 and a memory 402. The memory 402 stores a program or instructions capable of running on the processor 401. For example, when the communication device 400 is a terminal, and the program or instructions are executed by the processor 401, each step of the foregoing embodiment of the encoding method is implemented, with the same technical effect achieved. When the communication device 400 is a network-side device, and the program or instructions are executed by the processor 401, each step of the foregoing embodiment of the encoding method is implemented, with the same technical effect achieved. To avoid repetition, details are not described herein again.

An embodiment of this application further provides an encoder, including a processor and a communication interface. The processor is configured to perform, by the encoder, space-time block code encoding on data based on a preset codebook, where the preset codebook is a non-full-rate orthogonal codebook over a field of complex numbers in which an Alamouti codebook sub-block in the codebook is replaced with an NSTBC codebook sub-block, and columns of the preset codebook are pairwise orthogonal.

Figure 5:
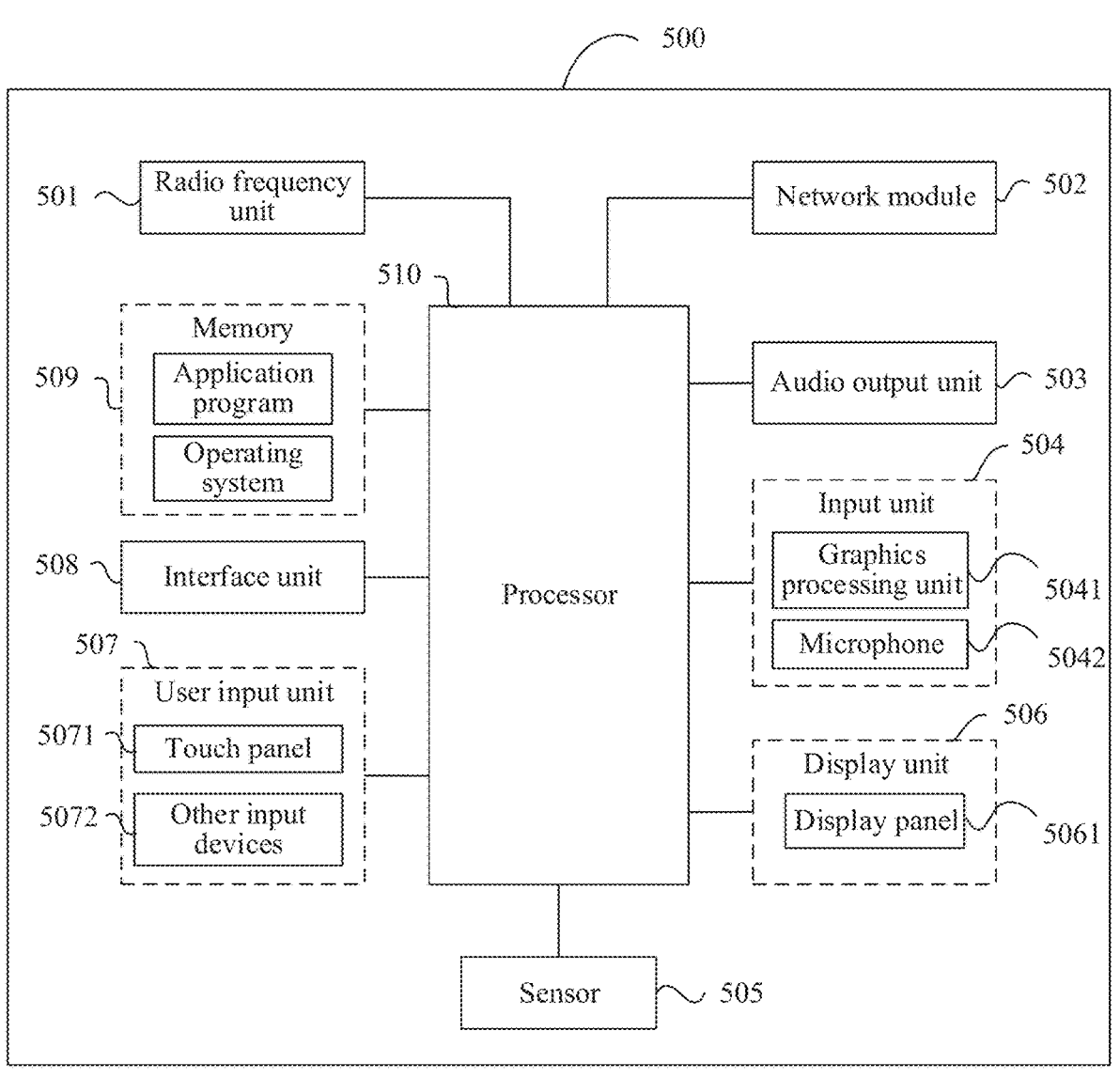
FIG. 5 is a schematic diagram of a structure of a terminal according to an embodiment of this application.

Specifically, in a case that the encoder is a terminal, FIG. 5 is a schematic diagram of a hardware structure of a terminal for implementing an embodiment of this application.

The terminal 500 includes but is not limited to at least some components such as a radio frequency unit 501, a network module 502, an audio output unit 503, an input unit 504, a sensor 505, a display unit 506, a user input unit 507, an interface unit 508, a memory 509, and a processor 510.

A person skilled in the art may understand that the terminal 500 may further include a power supply (for example, a battery) supplying power to all components. The power supply may be logically connected to the processor 510 through a power management system. In this way, functions such as charge management, discharge management, and power consumption management are implemented by using the power management system. The terminal structure shown in FIG. 5 does not constitute a limitation on the terminal. The terminal may include more or fewer components than those shown in the figure, or some components are combined, or component arrangements are different. Details are not described herein again.

It should be understood that, in this embodiment of this application, the input unit 504 may include a graphics processing unit (GPU) 5041 and a microphone 5042. The graphics processing unit 5041 processes image data of a still picture or video obtained by an image capture apparatus (such as a camera) in a video capture mode or an image capture mode. The display unit 506 may include a display panel 5061, and the display panel 5061 may be configured in a form of a liquid crystal display, an organic light-emitting diode, or the like. The user input unit 507 includes at least one of a touch panel 5071 and other input devices 5072. The touch panel 5071 is also referred to as a touchscreen. The touch panel 5071 may include two parts: a touch detection apparatus and a touch controller. The other input devices 5072 may include but are not limited to a physical keyboard, a function button (such as a volume control button or a power button), a trackball, a mouse, and a joystick. Details are not described herein again.

In this embodiment of this application, after receiving downlink data from a network-side device, the radio frequency unit 501 may transmit the downlink data to the processor 510 for processing. In addition, the radio frequency unit 501 may send uplink data to the network-side device. Usually, the radio frequency unit 501 includes but is not limited to an antenna, an amplifier, a transceiver, a coupler, a low noise amplifier, a duplexer, and the like.

The memory 509 may be configured to store software programs or instructions and various data. The memory 509 may primarily include a first storage area for storing programs or instructions and a second storage area for storing data. The first storage area may store an operating system, an application program or instructions required by at least one function (such as an audio play function and an image play function), and the like. In addition, the memory 509 may include a volatile memory or a non-volatile memory, or the memory 509 may include both a volatile memory and a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data rate SDRAM, DDR SDRAM), an enhanced synchronous dynamic random access memory (Enhanced SDRAM, ESDRAM), a synchlink dynamic random access memory (Synch Link DRAM, SLDRAM), and a direct rambus random access memory (Direct Rambus RAM, DRRAM). The memory 509 in this embodiment of this application includes but is not limited to these and any other suitable types of memories.

The processor 510 may include one or more processing units. Optionally, the processor 510 integrates an application processor and a modem processor. The application processor mainly processes operations related to the operating system, a user interface, an application program, and the like. The modem processor mainly processes a wireless communication signal. For example, the modem processor is a baseband processor. It may be understood that the modem processor may alternatively be not integrated in the processor 510.

The processor 510 is configured to perform, by an encoder, space-time block code encoding on data based on a preset codebook, where the preset codebook is a non-full-rate orthogonal codebook over a field of complex numbers in which an Alamouti codebook sub-block in the codebook is replaced with an NSTBC codebook sub-block, and columns of the preset codebook are pairwise orthogonal.

In this embodiment of this application, the Alamouti codebook sub-block in the non-full-rate orthogonal codebook over the field of complex numbers is replaced with the NSTBC codebook sub-block. On one hand, based on the non-full-rate orthogonal codebook over the field of complex numbers, by reducing a rate requirement, orthogonality of the codebook is ensured, processing complexity of a receive end is reduced, and degradation of communication performance is avoided. On the other hand, based on an NSTBC codebook, a quantity or types of load impedances on some antennas can be reduced, and a probability of error detection can be effectively reduced, while a diversity gain is ensured.

Specifically, a structure of the NSTBC codebook is:

$$S = \begin{bmatrix} s_{12} & s_{34}^* \\ s_{34} & -s_{12}^* \end{bmatrix},$$

where

S is the NSTBC codebook, and elements in S include $$s_{12}, s_{34}, s_{34}^*,$$

and $$-s_{12}^*;$$

$s_{12}$ is a first basic element, $s_{34}$ is a second basic element, $$-s_{12}^*$$

is a first generation element, and $$s_{34}^*$$

is a second generation element; and $$s_{12}, s_{34}, s_{34}^*,$$

and $$-s_{12}^*$$

meet:

in a case that N is equal to 2, N is a quantity of transmit antennas, $s_{12}$, $s_{34}$, $$s_{34}^*,$$

and $$-s_{12}^*$$

are all complex numbers, $$s_{34}^*$$

is a conjugate complex number of $s_{34}$, and $$-s_{12}^*$$

is an opposite number of a conjugate complex number of $s_{12}$.

Specifically, a structure of the preset codebook is:

$$S_c = \begin{pmatrix} s_1 & s_2^* & \dots & \# \\ s_2 & -s_1^* & \dots & \# \\ \vdots & \vdots & \ddots & \vdots \\ \# & \# & \dots & \# \end{pmatrix},$$

where $S_c$ is the preset codebook, dimensions of $S_c$ are (p×n), n is a quantity of transmit antennas, p is a symbol period, $s_1$ and $$s_2^*$$

are transmitted symbols that are on a first transmit antenna and a second transmit antenna and that are obtained by the encoder through encoding in a first symbol period, $s_2$ and $$-s_1^*$$

are transmitted symbols that are on the first transmit antenna and the second transmit antenna and that are obtained by the encoder through encoding in a second symbol period, the symbol $$s_2^*$$

is a conjugate of the symbol $s_2$, the symbol $$-s_1^*$$

is a negative conjugate of the symbol $s_1$, and # is another symbol over the field of complex numbers in the preset codebook.

Specifically, columns $B_a$ and $B_b$ of the preset codebook meet:

$$B_a^T \cdot B_b = 0;$$

and the preset codebook meets:

$$S_c^H \cdot S_c = \alpha \times I_{n \times n},$$

where a and b are integers, 1≤a, b≤n, and a≠b; and $$B_a^T$$

is a transpose of $B_a$, $$S_c^H$$

is a conjugate transpose of $S_c$, and $\alpha$ is a coefficient factor related to a symbol in the preset codebook.

$$\alpha = \sum_{a=1}^{n} B_a^H B_a$$

Specifically, the another symbol # over the field of complex numbers in the preset codebook meets:

$$\# \notin \{s_1, s_1^*, -s_1, -s_1^*, s_2, s_2^*, -s_2, -s_2^*\}.$$

Specifically, a rate R of the preset codebook meets:

$$R \leq \frac{m+1}{2m},$$

where n=2m or n=2m+1, n is the quantity of transmit antennas, and m is an integer greater than or equal to 1.

Specifically, in a case of $$R = \frac{3}{4}$$

and n=3, the structure of the preset codebook is:

$$
S_{c,\frac{3}{4}}^{3,1} = \begin{pmatrix} s_1 & s_2^* & \dfrac{s_3^*}{\sqrt{2}} \\[2mm] s_2 & -s_1^* & \dfrac{s_3^*}{\sqrt{2}} \\[2mm] \dfrac{s_3^*}{\sqrt{2}} & -\dfrac{s_3^*}{\sqrt{2}} & \dfrac{(-s_1-s_1^*-s_2+s_2^*)}{2} \\[2mm] \dfrac{s_3^*}{\sqrt{2}} & \dfrac{s_3^*}{\sqrt{2}} & \dfrac{(-s_2-s_2^*-s_1+s_1^*)}{2} \end{pmatrix} ; \text{ or}
$$

the structure of the preset codebook is:

$$
S_{c,\frac{3}{4}}^{3,2} = \begin{pmatrix} s_1 & s_2^* & -\dfrac{s_3^*}{\sqrt{2}} \\[2mm] s_2 & -s_1^* & \dfrac{s_3^*}{\sqrt{2}} \\[2mm] \dfrac{s_3^*}{\sqrt{2}} & -\dfrac{s_3^*}{\sqrt{2}} & \dfrac{(-s_2-s_2^*+s_1-s_1^*)}{2} \\[2mm] \dfrac{s_3^*}{\sqrt{2}} & \dfrac{s_3^*}{\sqrt{2}} & \dfrac{(s_1+s_1^*-s_2+s_2^*)}{2} \end{pmatrix} ; \text{ or}
$$

the structure of the preset codebook is:

$$
S_{c,\frac{3}{4}}^{3,3} = \begin{pmatrix} s_1 & s_2^* & \dfrac{s_3}{\sqrt{2}} \\[2mm] s_2 & -s_1^* & \dfrac{s_3}{\sqrt{2}} \\[2mm] \dfrac{s_3^*}{\sqrt{2}} & -\dfrac{s_3^*}{\sqrt{2}} & \dfrac{(-s_1-s_1^*+s_2-s_2^*)}{2} \\[2mm] \dfrac{s_3^*}{\sqrt{2}} & \dfrac{s_3^*}{\sqrt{2}} & \dfrac{(-s_2-s_2^*+s_1-s_1^*)}{2} \end{pmatrix} ; \text{ or}
$$

the structure of the preset codebook is:

$$
S_{c,\frac{3}{4}}^{3,4} = \begin{pmatrix} s_1 & s_2^* & -\dfrac{s_3}{\sqrt{2}} \\[2mm] s_2 & -s_1^* & \dfrac{s_3}{\sqrt{2}} \\[2mm] \dfrac{s_3^*}{\sqrt{2}} & -\dfrac{s_3^*}{\sqrt{2}} & \dfrac{(-s_2-s_2^*-s_1+s_1^*)}{2} \\[2mm] \dfrac{s_3^*}{\sqrt{2}} & \dfrac{s_3^*}{\sqrt{2}} & \dfrac{(s_1+s_1^*-s_2-s_2^*)}{2} \end{pmatrix} .
$$

Specifically, in a case of $$
R = \frac{3}{4}
$$

and n=4, the structure of the preset codebook is:

$$
S_{c,\frac{3}{4}}^{4,1} = \begin{pmatrix} s_1 & s_2^* & \dfrac{s_3^*}{\sqrt{2}} & -\dfrac{s_3^*}{\sqrt{2}} \\[2mm] s_2 & -s_1^* & \dfrac{s_3^*}{\sqrt{2}} & \dfrac{s_3^*}{\sqrt{2}} \\[2mm] \dfrac{s_3^*}{\sqrt{2}} & -\dfrac{s_3^*}{\sqrt{2}} & \dfrac{(-s_1-s_1^*-s_2+s_2^*)}{2} & \dfrac{(-s_2-s_2^*+s_1-s_1^*)}{2} \\[2mm] \dfrac{s_3^*}{\sqrt{2}} & \dfrac{s_3^*}{\sqrt{2}} & \dfrac{(-s_2-s_2^*-s_1+s_1^*)}{2} & \dfrac{(s_1+s_1^*-s_2+s_2^*)}{2} \end{pmatrix} ;
$$

or the structure of the preset codebook is:

$$
S_{c,\frac{3}{4}}^{4,2} = \begin{pmatrix} s_1 & s_2^* & \dfrac{s_3}{\sqrt{2}} & -\dfrac{s_3}{\sqrt{2}} \\[2mm] s_2 & -s_1^* & \dfrac{s_3}{\sqrt{2}} & \dfrac{s_3}{\sqrt{2}} \\[2mm] \dfrac{s_3^*}{\sqrt{2}} & -\dfrac{s_3^*}{\sqrt{2}} & \dfrac{(-s_1-s_1^*+s_2-s_2^*)}{2} & \dfrac{(-s_2-s_2^*-s_1+s_1^*)}{2} \\[2mm] \dfrac{s_3^*}{\sqrt{2}} & \dfrac{s_3^*}{\sqrt{2}} & \dfrac{(-s_2-s_2^*+s_1-s_1^*)}{2} & \dfrac{(s_1+s_1^*+s_2-s_2^*)}{2} \end{pmatrix} .
$$

Figure 6:
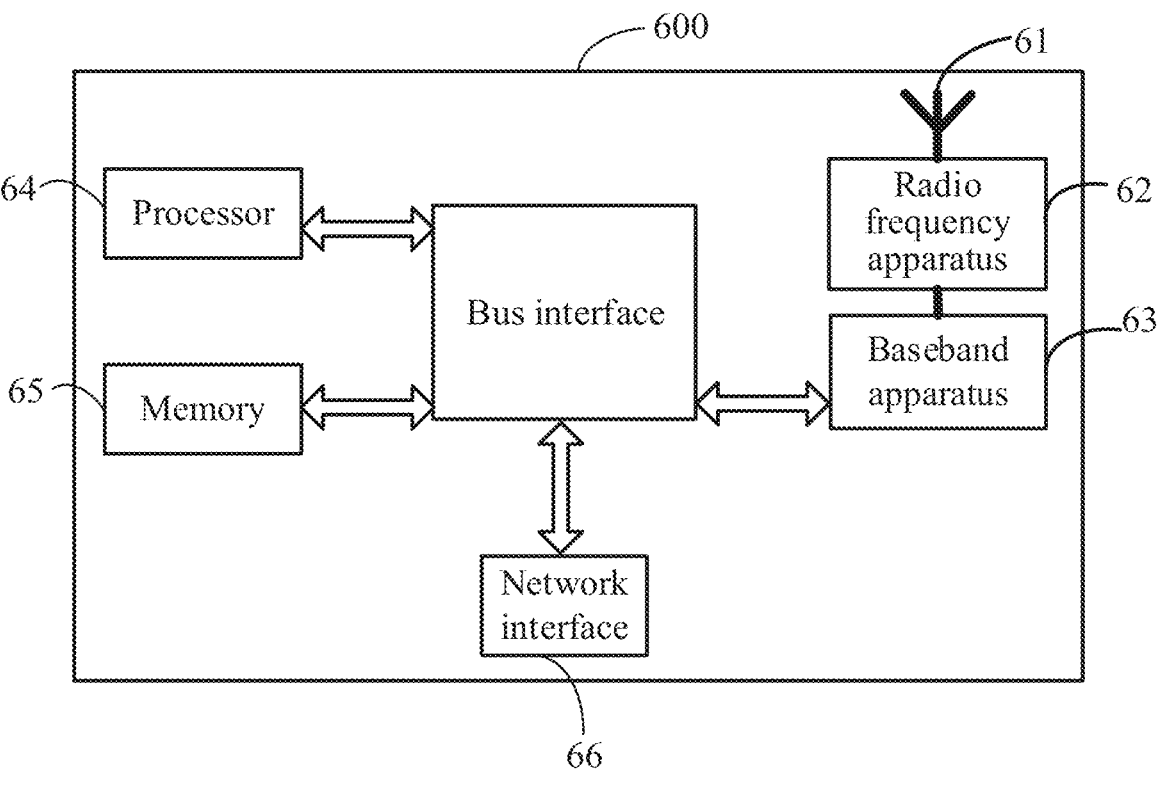
FIG. 6 is a schematic diagram of a structure of a network-side device according to an embodiment of this application.

Specifically, in a case that the encoder is a network-side device, as shown in FIG. 6, the network-side device 600 includes an antenna 61, a radio frequency apparatus 62, a baseband apparatus 63, a processor 64, and a memory 65. The antenna 61 is connected to the radio frequency apparatus 62. In an uplink direction, the radio frequency apparatus 62 receives information by using the antenna 61, and sends the received information to the baseband apparatus 63 for processing. In a downlink direction, the baseband apparatus 63 processes to-be-sent information, and sends the information to the radio frequency apparatus 62; and the radio frequency apparatus 62 processes the received information and then sends the information out by using the antenna 61.

The method in the foregoing method embodiment may be implemented in the baseband apparatus 63. The baseband apparatus 63 includes a baseband processor.

The baseband apparatus 63 may include, for example, at least one baseband unit, where a plurality of chips are disposed on the baseband unit. As shown in FIG. 6, one of the chips is, for example, the baseband processor, connected to the memory 65 by using a bus interface, to invoke a program in the memory 65 to perform the operation of the network-side device shown in the foregoing method embodiment.

The network-side device may further include a network interface 66, where the interface is, for example, a common public radio interface (CPRI).

Specifically, the network-side device 600 in this embodiment of the present invention further includes a program or instructions stored in the memory 65 and capable of running on the processor 64. When the processor 64 invokes the program or instructions in the memory 65, the method performed by each module shown in FIG. 3 is performed, with the same technical effect achieved. To avoid repetition, details are not described herein again.

An embodiment of this application further provides a readable storage medium. The readable storage medium stores a program or instructions. When the program or instructions are executed by a processor, each process of the foregoing embodiment of the encoding method is implemented, with the same technical effect achieved. To avoid repetition, details are not described herein again.

The processor is a processor in the terminal in the foregoing embodiment. The readable storage medium includes a computer-readable storage medium, such as a computer read-only memory ROM, a random access memory RAM, a magnetic disk, or an optical disc.

In addition, an embodiment of this application provides a chip. The chip includes a processor and a communication interface. The communication interface is coupled to the processor. The processor is configured to run a program or instructions to implement each process of the foregoing embodiment of the encoding method, with the same technical effect achieved. To avoid repetition, details are not described herein again. It should be understood that the chip provided in this embodiment of this application may also be referred to as a system-level chip, a system chip, a chip system, a system-on-chip, or the like.

In addition, an embodiment of this application provides a computer program product. The computer program product is stored in a storage medium. The computer program product is executed by at least one processor to implement each process of the foregoing embodiment of the encoding method, with the same technical effect achieved. To avoid repetition, details are not described herein again.

An embodiment of this application further provides a communication device, configured to perform each process of the foregoing embodiment of the encoding method, with the same technical effect achieved. To avoid repetition, details are not described herein again.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and apparatus in the implementations of this application is not limited to performing the functions in an order shown or discussed, and may further include performing the functions in a substantially simultaneous manner or in a reverse order depending on the functions used. For example, the method described may be performed in an order different from that described, and various steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary general hardware platform, and certainly may alternatively be implemented by using hardware. However, in most cases, the former is a preferred implementation. Based on such an understanding, the technical solutions of this application essentially or the part contributing to the prior art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. Inspired by this application, a person of ordinary skill in the art may develop many other manners without departing from principles of this application and the protection scope of the claims, and all such manners fall within the protection scope of this application.

What is claimed is:

1. An encoding method, comprising:

performing, by an encoder, space-time block code encoding on data based on a preset codebook, wherein the preset codebook is a non-full-rate orthogonal codebook over a field of complex numbers in which an Alamouti codebook sub-block in the codebook is replaced with a new space-time block code (NSTBC) codebook sub-block, and columns of the preset codebook are pairwise orthogonal.

2. The method according to claim 1, wherein a structure of an NSTBC codebook is:

$$S = \begin{bmatrix} s_{12} & s_{34}^* \\ s_{34} & -s_{12}^* \end{bmatrix},$$

wherein

S is the NSTBC codebook, and elements in S comprise $$s_{12}, s_{34}, s_{34}^*,$$

and $$-s_{12}^*; s_{12}$$

is a first basic element, $s_{34}$ is a second basic element, $$-s_{12}^*$$

is a first generation element, and $$s_{34}^*$$

is a second generation element; and $$s_{12}, s_{34}, s_{34}^*,$$

and $$-s_{12}^*$$

meet:

in a case that N is equal to 2, N is a quantity of transmit antennas, $$s_{12}, s_{34}, s_{34}^*,$$

and $$-s_{12}^*$$

are all complex numbers, $$s_{34}^*$$

is a conjugate complex number of $s_{34}$, and $$-s_{12}^*$$

is an opposite number of a conjugate complex number of $s_{12}$.

3. The method according to claim 2, wherein a structure of the preset codebook is:

$$S_c = \begin{pmatrix} s_1 & s_2^* & \dots & \# \\ s_2 & -s_1^* & \dots & \# \\ \vdots & \vdots & \ddots & \vdots \\ \# & \# & \dots & \# \end{pmatrix},$$

wherein $S_c$ is the preset codebook, dimensions of $S_c$ are (p×n), n is a quantity of transmit antennas, p is a symbol period, $s_1$ and $$s_2^*$$

are transmitted symbols that are on a first transmit antenna and a second transmit antenna and that are obtained by the encoder through encoding in a first symbol period, $s_2$ and $$-s_1^*$$

are transmitted symbols that are on the first transmit antenna and the second transmit antenna and that are obtained by the encoder through encoding in a second symbol period, the symbol $$s_2^*$$

is a conjugate of the symbol $s_2$, the symbol $$-s_1^*$$

is a negative conjugate of the symbol $s_1$, and # is another symbol over the field of complex numbers in the preset codebook.

4. The method according to claim 3, wherein columns $B_a$ and $B_b$ of the preset codebook meet:

$$B_a^T \cdot B_b = 0;$$

and the preset codebook meets:

$$S_c^H \cdot S_c = \alpha \times I_{n \times n},$$

wherein a and b are integers, 1≤a, b≤n, and a≠b; and $$B_a^T$$

is a transpose of $B_a$, $$S_c^H$$

is a conjugate transpose of $S_c$, and $\alpha$ is a coefficient factor related to a symbol in the preset codebook.

5. The method according to claim 3, wherein the another symbol # over the field of complex numbers in the preset codebook meets:

$$\# \notin \{s_1, s_1^*, -s_1, -s_1^*, s_2, s_2^*, -s_2, -s_2^*\}.$$

6. The method according to claim 3, wherein a rate R of the preset codebook meets:

$$R \le \frac{m+1}{2m},$$

n=2m or n=2m+1, n is the quantity of transmit antennas, and m is an integer greater than or equal to 1.

7. The method according to claim 6, wherein in a case of $$R = \frac{3}{4}$$

and n=3, the structure of the preset codebook is:

$$
S_{c,\frac{3}{4}}^{3,1} = \begin{pmatrix} s_1 & s_2^* & \dfrac{s_3^*}{\sqrt{2}} \\[2ex] s_2 & -s_1^* & \dfrac{s_3^*}{\sqrt{2}} \\[2ex] \dfrac{s_3^*}{\sqrt{2}} & -\dfrac{s_3^*}{\sqrt{2}} & \dfrac{(-s_1-s_1^*-s_2+s_2^*)}{2} \\[2ex] \dfrac{s_3^*}{\sqrt{2}} & \dfrac{s_3^*}{\sqrt{2}} & \dfrac{(-s_2-s_2^*-s_1+s_1^*)}{2} \end{pmatrix};
$$

or the structure of the preset codebook is:

$$
S_{c,\frac{3}{4}}^{3,2} = \begin{pmatrix} s_1 & s_2^* & -\dfrac{s_3^*}{\sqrt{2}} \\[2ex] s_2 & -s_1^* & \dfrac{s_3^*}{\sqrt{2}} \\[2ex] \dfrac{s_3^*}{\sqrt{2}} & -\dfrac{s_3^*}{\sqrt{2}} & \dfrac{(-s_2-s_2^*+s_1-s_1^*)}{2} \\[2ex] \dfrac{s_3^*}{\sqrt{2}} & \dfrac{s_3^*}{\sqrt{2}} & \dfrac{(s_1+s_1^*-s_2+s_2^*)}{2} \end{pmatrix};
$$

or the structure of the preset codebook is:

$$
S_{c,\frac{3}{4}}^{3,3} = \begin{pmatrix} s_1 & s_2^* & \dfrac{s_3}{\sqrt{2}} \\[2ex] s_2 & -s_1^* & \dfrac{s_3}{\sqrt{2}} \\[2ex] \dfrac{s_3^*}{\sqrt{2}} & -\dfrac{s_3^*}{\sqrt{2}} & \dfrac{(-s_1-s_1^*+s_2-s_2^*)}{2} \\[2ex] \dfrac{s_3^*}{\sqrt{2}} & \dfrac{s_3^*}{\sqrt{2}} & \dfrac{(-s_2-s_2^*+s_1-s_1^*)}{2} \end{pmatrix};
$$

or the structure of the preset codebook is:

$$
S_{c,\frac{3}{4}}^{3,4} = \begin{pmatrix} s_1 & s_2^* & -\dfrac{s_3}{\sqrt{2}} \\[2ex] s_2 & -s_1^* & \dfrac{s_3}{\sqrt{2}} \\[2ex] \dfrac{s_3^*}{\sqrt{2}} & -\dfrac{s_3^*}{\sqrt{2}} & \dfrac{(-s_2-s_2^*-s_1+s_1^*)}{2} \\[2ex] \dfrac{s_3^*}{\sqrt{2}} & \dfrac{s_3^*}{\sqrt{2}} & \dfrac{(s_1+s_1^*+s_2-s_1^*)}{2} \end{pmatrix}.
$$

8. The method according to claim 6, wherein in a case of $$R = \frac{3}{4}$$

and n=4, the structure of the preset codebook is:

$$
S_{c,\frac{3}{4}}^{4,1} = \begin{pmatrix} s_1 & s_2^* & \dfrac{s_3^*}{\sqrt{2}} & -\dfrac{s_3^*}{\sqrt{2}} \\[2ex] s_2 & -s_1^* & \dfrac{s_3^*}{\sqrt{2}} & \dfrac{s_3^*}{\sqrt{2}} \\[2ex] \dfrac{s_3^*}{\sqrt{2}} & -\dfrac{s_3^*}{\sqrt{2}} & \dfrac{(-s_1-s_1^*-s_2+s_2^*)}{2} & \dfrac{(-s_2-s_2^*+s_1-s_1^*)}{2} \\[2ex] \dfrac{s_3^*}{\sqrt{2}} & \dfrac{s_3^*}{\sqrt{2}} & \dfrac{(-s_2-s_2^*-s_1+s_1^*)}{2} & \dfrac{(s_1+s_1^*-s_2+s_2^*)}{2} \end{pmatrix};
$$

or the structure of the preset codebook is:

$$
S_{c,\frac{3}{4}}^{4,2} = \begin{pmatrix} s_1 & s_2^* & \dfrac{s_3}{\sqrt{2}} & -\dfrac{s_3}{\sqrt{2}} \\[2ex] s_2 & -s_1^* & \dfrac{s_3}{\sqrt{2}} & \dfrac{s_3}{\sqrt{2}} \\[2ex] \dfrac{s_3^*}{\sqrt{2}} & -\dfrac{s_3^*}{\sqrt{2}} & \dfrac{(-s_1-s_1^*+s_2-s_2^*)}{2} & \dfrac{(-s_2-s_2^*-s_1+s_1^*)}{2} \\[2ex] \dfrac{s_3^*}{\sqrt{2}} & \dfrac{s_3^*}{\sqrt{2}} & \dfrac{(-s_2-s_2^*+s_1-s_1^*)}{2} & \dfrac{(s_1+s_1^*+s_2-s_2^*)}{2} \end{pmatrix}.
$$

9. A non-transitory readable storage medium, wherein the non-transitory readable storage medium stores a program or instructions, and when the program or instructions are executed by a processor, the steps of the encoding method according to claim 1 are implemented.

10. A chip, comprising a processor and a communication interface, wherein the communication interface is coupled to the processor, and the processor is configured to run a program or instructions to implement the steps of the encoding method according to claim 1.

11. A computer program product, wherein the program product is stored in a non-volatile storage medium, and the program product is executed by at least one processor to implement the steps of the encoding method according to claim 1.

12. A terminal, comprising a processor and a memory, wherein the memory stores a program or instructions capable of running on the processor, wherein the program or instructions, when executed by the processor, cause the terminal to perform:

performing space-time block code encoding on data based on a preset codebook, wherein the preset codebook is a non-full-rate orthogonal codebook over a field of complex numbers in which an Alamouti codebook sub-block in the codebook is replaced with a new space-time block code (NSTBC) codebook sub-block, and columns of the preset codebook are pairwise orthogonal.

13. The terminal according to claim 12, wherein a structure of an NSTBC codebook is:

$$
S = \begin{bmatrix} s_{12} & s_{34}^* \\ s_{34} & -s_{12}^* \end{bmatrix},
$$

wherein

S is the NSTBC codebook, and elements in S comprise $$s_{12}, s_{34}, s_{34}^*,$$

<table>
<tr><td>39</td><td>40</td></tr>
</table> and $$-s_{12}^*; s_{12}$$

is a first basic element, $s_{34}$ is a second basic element, $$-s_{12}^*$$

is a first generation element, and $$s_{34}^*$$

is a second generation element; and $$s_{12}, s_{34}, s_{34}^*,$$

and $$-s_{12}^*$$

meet:

in a case that N is equal to 2, N is a quantity of transmit antennas, $$s_{12}, s_{34}, s_{34}^*,$$

and $$-s_{12}^*$$

are all complex numbers, $$s_{34}^*$$

is a conjugate complex number of $s_{34}$, and $$-s_{12}^*$$

is an opposite number of a conjugate complex number of $s_{12}$.

14. The terminal according to claim 13, wherein a structure of the preset codebook is:

$$S_c = \begin{pmatrix} s_1 & s_2^* & \dots & \# \\ s_2 & -s_1^* & \dots & \# \\ \vdots & \vdots & \ddots & \vdots \\ \# & \# & \dots & \# \end{pmatrix},$$

wherein $S_c$ is the preset codebook, dimensions of $S_c$ are (p×n), n is a quantity of transmit antennas, p is a symbol period, $s_1$ and $$s_2^*$$

are transmitted symbols that are on a first transmit antenna and a second transmit antenna and that are obtained by an encoder through encoding in a first symbol period, $s_2$ and $$-s_1^*$$

are transmitted symbols that are on the first transmit antenna and the second transmit antenna and that are obtained by the encoder through encoding in a second symbol period, the symbol $$s_2^*$$

is a conjugate of the symbol $s_2$, the symbol $$-s_1^*$$

is a negative conjugate of the symbol $s_1$, and # is another symbol over the field of complex numbers in the preset codebook.

15. The terminal according to claim 14, wherein columns $B_a$ and $B_b$ of the preset codebook meet:

$$B_a^T \cdot B_b = 0;$$

and the preset codebook meets:

$$S_c^H \cdot S_c = \alpha \times I_{n \times n},$$

wherein a and b are integers, $1 \leq a$, $b \leq n$, and $a \neq b$; and $$B_a^T$$

is a transpose of $B_a$, $$S_c^H$$

is a conjugate transpose of $S_c$, and $\alpha$ is a coefficient factor related to a symbol in the preset codebook.

16. The terminal according to claim 14, wherein the another symbol # over the field of complex numbers in the preset codebook meets:

$$\# \notin \{s_1, s_1^*, -s_1, -s_1^*, s_2, s_2^*, -s_2, -s_2^*\}.$$

17. The terminal according to claim 14, wherein a rate R of the preset codebook meets:

$$R \le \frac{m+1}{2m},$$

wherein n=2m or n=2m+1, n is the quantity of transmit antennas, and m is an integer greater than or equal to 1.

18. The terminal according to claim 17, wherein in a case of $$R = \frac{3}{4}$$

and n=3, the structure of the preset codebook is:

$$S_{c,\frac{3}{4}}^{3,1} = \begin{pmatrix} s_1 & s_2^* & \dfrac{s_3^*}{\sqrt{2}} \\ s_2 & -s_1^* & \dfrac{s_3}{\sqrt{2}} \\ \dfrac{s_3^*}{\sqrt{2}} & -\dfrac{s_3^*}{\sqrt{2}} & \dfrac{(-s_1 - s_1^* - s_2 + s_2^*)}{2} \\ \dfrac{s_3^*}{\sqrt{2}} & \dfrac{s_3^*}{\sqrt{2}} & \dfrac{(-s_2 - s_2^* - s_1 + s_1^*)}{2} \end{pmatrix};$$

or the structure of the preset codebook is:

$$S_{c,\frac{3}{4}}^{3,2} = \begin{pmatrix} s_1 & s_2^* & -\dfrac{s_3^*}{\sqrt{2}} \\ s_2 & -s_1^* & \dfrac{s_3^*}{\sqrt{2}} \\ \dfrac{s_3^*}{\sqrt{2}} & -\dfrac{s_3^*}{\sqrt{2}} & \dfrac{(-s_2 - s_2^* + s_1 - s_1^*)}{2} \\ \dfrac{s_3^*}{\sqrt{2}} & \dfrac{s_3^*}{\sqrt{2}} & \dfrac{(s_1 + s_1^* - s_2 + s_2^*)}{2} \end{pmatrix};$$

or the structure of the preset codebook is:

$$S_{c,\frac{3}{4}}^{3,3} = \begin{pmatrix} s_1 & s_2^* & \dfrac{s_3}{\sqrt{2}} \\ s_2 & -s_1^* & \dfrac{s_3}{\sqrt{2}} \\ \dfrac{s_3^*}{\sqrt{2}} & -\dfrac{s_3^*}{\sqrt{2}} & \dfrac{(-s_1 - s_1^* + s_2 - s_2^*)}{2} \\ \dfrac{s_3^*}{\sqrt{2}} & \dfrac{s_3^*}{\sqrt{2}} & \dfrac{(-s_2 - s_2^* + s_1 - s_1^*)}{2} \end{pmatrix};$$

or the structure of the preset codebook is:

$$S_{c,\frac{3}{4}}^{3,4} = \begin{pmatrix} s_1 & s_2^* & -\dfrac{s_3}{\sqrt{2}} \\ s_2 & -s_1^* & \dfrac{s_3}{\sqrt{2}} \\ \dfrac{s_3^*}{\sqrt{2}} & -\dfrac{s_3^*}{\sqrt{2}} & \dfrac{(-s_2 - s_2^* - s_1 + s_1^*)}{2} \\ \dfrac{s_3^*}{\sqrt{2}} & \dfrac{s_3^*}{\sqrt{2}} & \dfrac{(s_1 + s_1^* + s_2 - s_2^*)}{2} \end{pmatrix}.$$

19. The terminal according to claim 17, wherein in a case of $$R = \frac{3}{4}$$

and n=4, the structure of the preset codebook is:

$$S_{c,\frac{3}{4}}^{4,1} = \begin{pmatrix} s_1 & s_2^* & \dfrac{s_3^*}{\sqrt{2}} & -\dfrac{s_3^*}{\sqrt{2}} \\ s_2 & -s_1^* & \dfrac{s_3^*}{\sqrt{2}} & \dfrac{s_3^*}{\sqrt{2}} \\ \dfrac{s_3^*}{\sqrt{2}} & -\dfrac{s_3^*}{\sqrt{2}} & \dfrac{(-s_1 - s_1^* - s_2 + s_2^*)}{2} & \dfrac{(-s_2 - s_2^* + s_1 - s_1^*)}{2} \\ \dfrac{s_3^*}{\sqrt{2}} & \dfrac{s_3^*}{\sqrt{2}} & \dfrac{(-s_2 - s_2^* - s_1 + s_1^*)}{2} & \dfrac{(s_1 + s_1^* - s_2 + s_2^*)}{2} \end{pmatrix};$$

or the structure of the preset codebook is:

$$S_{c,\frac{3}{4}}^{4,2} = \begin{pmatrix} s_1 & s_2^* & \dfrac{s_3}{\sqrt{2}} & -\dfrac{s_3}{\sqrt{2}} \\ s_2 & -s_1^* & \dfrac{s_3}{\sqrt{2}} & \dfrac{s_3}{\sqrt{2}} \\ \dfrac{s_3^*}{\sqrt{2}} & -\dfrac{s_3^*}{\sqrt{2}} & \dfrac{(-s_1 - s_1^* + s_2 - s_2^*)}{2} & \dfrac{(-s_2 - s_2^* - s_1 + s_1^*)}{2} \\ \dfrac{s_3^*}{\sqrt{2}} & \dfrac{s_3^*}{\sqrt{2}} & \dfrac{(-s_2 - s_2^* + s_1 - s_1^*)}{2} & \dfrac{(s_1 + s_1^* + s_2 - s_2^*)}{2} \end{pmatrix}.$$

20. A network-side device, comprising a processor and a memory, wherein the memory stores a program or instructions capable of running on the processor, wherein the program or instructions, when executed by the processor, cause the network-side device to perform:

performing space-time block code encoding on data based on a preset codebook, wherein the preset codebook is a non-full-rate orthogonal codebook over a field of complex numbers in which an Alamouti codebook sub-block in the codebook is replaced with a new space-time block code (NSTBC) codebook sub-block, and columns of the preset codebook are pairwise orthogonal.

\*    \*    \*    \*    \*